United States Patent
Lee et al.

(10) Patent No.: US 12,369,019 B2
(45) Date of Patent: *Jul. 22, 2025

(54) METHOD, APPARATUS, AND SYSTEM FOR AUTHORIZING REMOTE PROFILE MANAGEMENT

(71) Applicant: Samsung Electronics Co., Ltd., Suwon-si (KR)

(72) Inventors: Hyewon Lee, Suwon-si (KR); Duckey Lee, Suwon-si (KR); Jonghoe Koo, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,849

(22) Filed: May 20, 2024

(65) Prior Publication Data

US 2024/0314539 A1    Sep. 19, 2024

Related U.S. Application Data

(63) Continuation of application No. 17/568,433, filed on Jan. 4, 2022, now Pat. No. 11,991,780, which is a
(Continued)

(30) Foreign Application Priority Data

Aug. 7, 2018   (KR) ........................ 10-2018-0092058
Jun. 11, 2019  (KR) ........................ 10-2019-0068808

(51) Int. Cl.
*H04W 8/18*    (2009.01)
*H04L 67/303*  (2022.01)
(Continued)

(52) U.S. Cl.
CPC ........... *H04W 8/183* (2013.01); *H04L 67/303* (2013.01); *H04W 12/041* (2021.01); *H04W 12/069* (2021.01)

(58) Field of Classification Search
CPC ........ H04L 67/303; H04W 4/60; H04W 8/18; H04W 8/183; H04W 8/20; H04W 8/205;
(Continued)

(56) References Cited

U.S. PATENT DOCUMENTS 8,555,067 B2 * 10/2013 Schell ................... H04W 12/35
726/28
8,666,361 B2 * 3/2014 Chu ................... H04M 1/72424
455/411
(Continued)

FOREIGN PATENT DOCUMENTS

CN    107534856 A    1/2018
CN    110121859 A    8/2019
(Continued)

OTHER PUBLICATIONS

International Search Report dated Nov. 20, 2019, issued in International Application No. PCT/KR2019/009906.
(Continued)

*Primary Examiner* — Eric Nowlin
(74) *Attorney, Agent, or Firm* — Jefferson IP Law, LLP

(57) ABSTRACT

A method, performed by a user equipment (UE), of controlling a profile is provided. The method includes receiving a remote profile management command regarding a target profile from a profile server, determining whether an enabled profile exists, verifying whether profile owner information of the target profile corresponds to profile owner information or sub-owner information of the enabled profile, based a
(Continued)

result of the determination, and selectively executing the remote profile management command based on a result of the verification.

18 Claims, 12 Drawing Sheets

Related U.S. Application Data continuation of application No. 16/534,194, filed on Aug. 7, 2019, now Pat. No. 11,223,942.

(51) Int. Cl.
*H04W 12/041* (2021.01)
*H04W 12/069* (2021.01)

(58) Field of Classification Search
CPC ....... H04W 12/0023; H04W 12/00403; H04W 12/00514; H04W 12/0401; H04W 12/06; H04W 12/0609
See application file for complete search history.

(56) References Cited

U.S. PATENT DOCUMENTS

| | | | |
|---|---|---|---|
| 8,843,179 B2* | 9/2014 | Li | H04W 8/20 455/410 |
| 8,868,041 B2* | 10/2014 | O'Leary | H04W 8/183 455/406 |
| 8,924,715 B2* | 12/2014 | Schell | H04W 4/50 455/411 |
| 9,009,475 B2 | 4/2015 | Hauck et al. | |
| 9,204,300 B2 | 12/2015 | Park et al. | |
| 9,451,446 B2 | 9/2016 | Spanel et al. | |
| 9,668,122 B2 | 5/2017 | Petersson et al. | |
| 9,820,139 B1 | 11/2017 | Veneroso | |
| 9,826,403 B2 | 11/2017 | Caceres et al. | |
| 9,867,037 B2 | 1/2018 | Caceres et al. | |
| 9,955,353 B2 | 4/2018 | Guday et al. | |
| 10,003,956 B2 | 6/2018 | Veneroso | |
| 10,038,998 B2 | 7/2018 | Caceres et al. | |
| 10,182,340 B2 | 1/2019 | Gao | |
| 10,194,316 B2* | 1/2019 | Jung | H04W 8/205 |
| 10,231,118 B2 | 3/2019 | Veneroso | |
| 10,237,723 B2 | 3/2019 | Borse | |
| 10,334,427 B2 | 6/2019 | Yang | |
| 10,362,485 B2 | 7/2019 | Guday et al. | |
| 10,368,235 B1 | 7/2019 | Balasubramanian et al. | |
| 10,368,240 B2 | 7/2019 | Park et al. | |
| 10,440,557 B2 | 10/2019 | Kim et al. | |
| 10,477,384 B2 | 11/2019 | Namiranian | |
| 10,530,756 B1 | 1/2020 | Youngs et al. | |
| 10,536,844 B2* | 1/2020 | Park | H04W 88/06 |
| 10,567,576 B2 | 2/2020 | Yeoum et al. | |
| 10,609,022 B2* | 3/2020 | Park | H04W 12/06 |
| 10,615,990 B2* | 4/2020 | Yang | H04W 12/35 |
| 10,645,665 B2 | 5/2020 | Shah | |
| 10,652,731 B2 | 5/2020 | Park et al. | |
| 10,698,626 B2 | 6/2020 | Caserta | |
| 10,708,761 B1* | 7/2020 | Yin | H04W 8/205 |
| 10,735,944 B2 | 8/2020 | Syed et al. | |
| 10,776,683 B2 | 9/2020 | Yi et al. | |
| 10,820,190 B2 | 10/2020 | Xu | |
| 10,985,926 B2* | 4/2021 | Yang | H04W 12/42 |
| 10,999,273 B2* | 5/2021 | Park | H04W 12/068 |
| 11,223,942 B2* | 1/2022 | Lee | H04W 12/069 |
| 11,259,173 B2 | 2/2022 | Kim et al. | |
| 11,282,056 B2 | 3/2022 | Gravallon et al. | |
| 11,516,672 B2 | 11/2022 | Yu et al. | |
| 11,533,160 B2* | 12/2022 | Yang | H04L 67/30 |
| 11,595,813 B2 | 2/2023 | Johansson et al. | |
| 11,617,065 B2* | 3/2023 | Lankalapalli | H04L 67/141 709/220 |
| 11,991,780 B2* | 5/2024 | Lee | H04L 67/303 |
| 12,041,690 B2* | 7/2024 | Kang | H04W 8/183 |
| 2013/0231087 A1* | 9/2013 | O'Leary | H04W 12/084 455/411 |
| 2013/0303122 A1* | 11/2013 | Li | H04W 8/20 455/418 |
| 2014/0038563 A1* | 2/2014 | O'Leary | H04W 8/22 455/418 |
| 2014/0308991 A1 | 10/2014 | Lee et al. | |
| 2015/0110035 A1 | 4/2015 | Lee et al. | |
| 2016/0119780 A1* | 4/2016 | Jung | H04W 8/205 455/419 |
| 2016/0142906 A1* | 5/2016 | Park | H04W 8/205 455/419 |
| 2016/0285493 A1* | 9/2016 | Veneroso | H04L 67/306 |
| 2017/0048251 A1 | 2/2017 | Guday et al. | |
| 2017/0048713 A1 | 2/2017 | Guday et al. | |
| 2017/0064552 A1 | 3/2017 | Park et al. | |
| 2017/0222991 A1 | 8/2017 | Yang | |
| 2017/0280320 A1 | 9/2017 | Caceres et al. | |
| 2017/0280321 A1 | 9/2017 | Caceres et al. | |
| 2017/0289788 A1 | 10/2017 | Lalwaney | |
| 2017/0338944 A1* | 11/2017 | Yang | H04L 9/3297 |
| 2018/0027407 A1 | 1/2018 | Veneroso | |
| 2018/0098213 A1 | 4/2018 | Caceres et al. | |
| 2018/0109676 A1 | 4/2018 | Yeoum et al. | |
| 2018/0206123 A1 | 7/2018 | Guday et al. | |
| 2018/0249322 A1 | 8/2018 | Kim et al. | |
| 2018/0287863 A1 | 10/2018 | Finger et al. | |
| 2018/0288606 A1* | 10/2018 | Gao | H04W 8/183 |
| 2018/0294949 A1* | 10/2018 | Yang | H04W 12/106 |
| 2018/0295500 A1 | 10/2018 | Yang | |
| 2018/0295501 A1 | 10/2018 | Veneroso | |
| 2018/0341420 A1 | 11/2018 | Caserta | |
| 2018/0359629 A1 | 12/2018 | Manam et al. | |
| 2019/0050704 A1 | 2/2019 | Yi et al. | |
| 2019/0058989 A1* | 2/2019 | Park | H04W 8/205 |
| 2019/0208405 A1 | 7/2019 | Park et al. | |
| 2019/0223003 A1 | 7/2019 | Balasubramanian et al. | |
| 2019/0268755 A1 | 8/2019 | Namiranian | |
| 2019/0327605 A1 | 10/2019 | Fan et al. | |
| 2020/0084614 A1 | 3/2020 | Xu | |
| 2020/0162893 A1* | 5/2020 | Park | H04W 8/20 |
| 2020/0236546 A1 | 7/2020 | Yu et al. | |
| 2020/0260274 A1 | 8/2020 | Gudivada et al. | |
| 2020/0280839 A1 | 9/2020 | Ahmed et al. | |
| 2020/0314639 A1 | 10/2020 | Yu et al. | |
| 2020/0351656 A1 | 11/2020 | Johansson et al. | |
| 2020/0374686 A1 | 11/2020 | Zhang et al. | |
| 2020/0374694 A1 | 11/2020 | Fan et al. | |
| 2020/0396593 A1 | 12/2020 | Vikberg et al. | |
| 2021/0168598 A1 | 1/2021 | Park et al. | |
| 2021/0281998 A1 | 9/2021 | Kim et al. | |
| 2022/0022028 A1* | 1/2022 | Li | H04W 4/50 |
| 2022/0124481 A1* | 4/2022 | Kang | H04W 12/45 |
| 2022/0167172 A1 | 5/2022 | Fan et al. | |
| 2023/0017914 A1* | 1/2023 | Siryy | H04W 12/086 |
| 2023/0037497 A1* | 2/2023 | Yu | H04W 12/37 |
| 2024/0163656 A1* | 5/2024 | Verma | H04W 8/005 |
| 2024/0187841 A1* | 6/2024 | Homorodi | H04W 8/205 |
| 2024/0284165 A1* | 8/2024 | Li | H04W 8/245 |
| 2024/0314549 A1* | 9/2024 | Mayalil | H04W 8/265 |
| 2024/0334176 A1* | 10/2024 | Kang | H04W 12/45 |
| 2025/0016551 A1* | 1/2025 | Singh | H04W 8/183 |
| 2025/0056203 A1* | 2/2025 | Lor | H04W 4/50 |
| 2025/0080967 A1* | 3/2025 | Osborn | H04W 8/205 |

FOREIGN PATENT DOCUMENTS

| | | | | |
|---|---|---|---|---|
| CN | 108028758 B | 6/2021 | | |
| EP | 1973306 A1 * | 9/2008 | | H04L 67/02 |
| EP | 2448215 A1 * | 5/2012 | | H04L 63/0823 |
| EP | 2448216 A1 * | 5/2012 | | G06F 21/35 |
| EP | 2 773 077 A1 | 9/2014 | | |
| EP | 2 938 108 A1 | 10/2015 | | |
| EP | 3 267 699 A1 | 1/2018 | | |
| EP | 3 337 206 A1 | 6/2018 | | |
| EP | 3 346 637 A1 | 7/2018 | | |
| EP | 3 267 699 B1 | 1/2019 | | |

(56) References Cited

FOREIGN PATENT DOCUMENTS

| | | | |
|---|---|---|---|
| EP | 3 284 274 B1 | 7/2019 | |
| EP | 2 773 077 B1 | 8/2019 | |
| EP | 3 346 637 B1 | 10/2019 | |
| EP | 3 557 895 A1 | 10/2019 | |
| EP | 3 407 633 B1 | 11/2019 | |
| EP | 3 565 288 A1 | 11/2019 | |
| EP | 3073773 B1 * | 11/2019 | ........... H04B 1/3816 |
| EP | 3 413 602 B1 | 1/2020 | |
| EP | 3 606 119 A1 | 2/2020 | |
| EP | 3 609 208 A1 | 2/2020 | |
| EP | 3 618 478 A1 | 3/2020 | |
| EP | 3 657 729 A1 | 5/2020 | |
| EP | 3 657 729 A4 | 7/2020 | |
| EP | 3 675 537 A1 | 7/2020 | |
| EP | 3 606 119 B1 | 3/2021 | |
| EP | 3 618 478 B1 | 8/2021 | |
| EP | 3 703 400 B1 | 10/2021 | |
| EP | 3 557 895 B1 | 6/2022 | |
| EP | 4 009 680 A1 | 6/2022 | |
| EP | 3 675 537 B1 | 9/2022 | |
| EP | 3 661 146 B1 | 10/2022 | |
| EP | 3 741 145 B1 | 11/2022 | |
| EP | 4 164 263 A1 | 4/2023 | |
| EP | 4 171 088 A1 | 4/2023 | |
| ES | 2 871 926 T3 | 11/2021 | |
| ES | 2 931 954 T3 | 1/2023 | |
| JP | 2017-195455 A | 10/2017 | |
| JP | 2018512822 A | 5/2018 | |
| JP | 6752218 B2 | 9/2020 | |
| KR | 10-2018-0037220 A | 4/2018 | |
| KR | 10-2484365 B1 | 1/2023 | |
| WO | 2014/131785 A1 | 9/2014 | |
| WO | WO-2016068550 A1 * | 5/2016 | ............ H04W 8/205 |
| WO | 2017/030776 A1 | 2/2017 | |
| WO | 2017/039320 A1 | 3/2017 | |
| WO | 2017/082966 A1 | 5/2017 | |
| WO | 2018/048278 A1 | 3/2018 | |
| WO | 2018/101775 A1 | 6/2018 | |
| WO | 2018/160010 A1 | 9/2018 | |
| WO | 2019/041086 A1 | 3/2019 | |
| WO | 2019/137630 A1 | 7/2019 | |

OTHER PUBLICATIONS

Orange, "New requirements for Policy Rules, Policy Control and Policy Enforcement", ETSI Draft, Feb. 11, 2014, XP014189433.
Extended European Search Report dated Jun. 17, 2021, issued in European Patent Application No. 19846951.2-1213.
Indian Office Action dated Dec. 16, 2022, issued in an Indian Application No. 202137009052.
GSM Association; Remote Provisioning Architecture for Embedded UICC Technical Specification Version 1.0; Dec. 17, 2013.
European Office Action dated Mar. 13, 2023, issued in European Patent Application No. 19846951.2.
Japanese Office Action dated Mar. 28, 2023, issued in Japanese Patent Application No. 2021-506552.
Korean Office Action dated Nov. 20, 2023, issued in Korean Patent Application No. 10-2019-0068808.
Chinese Office Action dated Sep. 1, 2023, issued in Chinese Patent Application No. 201980052649.9.
Chinese Notice of Allowance dated Mar. 20, 2024, issued in Chinese Patent Application No. 201980052649.9.
GSM Association, Remote Provisioning Architecture for Embedded U ICC Technical Specification, May 27, 2016, Version 3.1, www.gsma.com/newsroom/wp-content/uploads/SGP.02_v3.1.pdf (obtained on Mar. 16, 2023) (Year: 2016).
European Notice of Allowance dated Jun. 26, 2024, issued in European Patent Application No. 19846951.2.
Indian Office Action dated Jun. 26, 2024, issued in an Indian Patent Application No. 202338018029.

* cited by examiner

METHOD, APPARATUS, AND SYSTEM FOR AUTHORIZING REMOTE PROFILE MANAGEMENT

CROSS-REFERENCE TO RELATED APPLICATION(S)

This application is a continuation application of prior application Ser. No. 17/568,433, filed on Jan. 4, 2022, which will be issued as U.S. Pat. No. 11,991,780 on May 21, 2024, which is a continuation application of prior application Ser. No. 16/534,194, filed on Aug. 7, 2019, which has issued as U.S. Pat. No. 11,223,942 on Jan. 11, 2022 and is based on and claims priority under 35 U.S.C. § 119(a) of a Korean patent application number 10-2018-0092058, filed on Aug. 7, 2018, in the Korean Intellectual Property Office, and of a Korean patent application number 10-2019-0068808, filed on Jun. 11, 2019, in the Korean Intellectual Property Office, the disclosure of each of which is incorporated by reference herein in its entirety.

BACKGROUND

1. Field

The disclosure relates to a method of managing a profile in a wireless communication system.

2. Description of Related Art

To satisfy soaring demand with respect to wireless data traffic since the commercialization of $4^{th}$-generation (4G) communication systems, efforts have been made to develop improved $5^{th}$-generation (5G) communication systems or pre-5G communication systems. For this reason, the 5G communication system or the pre-5G communication system is also referred to as a beyond-4G-network communication system or a post-long term evolution (LTE) system. For higher data transmission rates, 5G communication systems are considered to be implemented on ultra-high frequency bands (mmWave), such as 60 GHz. In the 5G communication system, beamforming, massive multi-input multi-output (MIMO), full dimensional MIMO (FD-MIMO), an array antenna, analog beamforming, and large-scale antenna technologies have been discussed to alleviate propagation path loss and to increase a propagation distance in the ultra-high frequency band. For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed. In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The Internet, which is a human-oriented connectivity network where humans generate and consume information, is now evolving into the Internet of Things (IoT), where distributed entities exchange and process information. The Internet of Everything (IoE) has also emerged, which is a combination of IoT technology and Big Data processing technology through connection with a cloud server, etc. To meet needs for technology elements, such as sensing technology, wired/wireless communication and network infrastructure, service interface technology, and security technology, for IoT implementation, a sensor network, machine to machine (M2M), machine type communication (MTC), and so forth have been recently researched for connection between things. Such an IoT environment may provide intelligent Internet technology (IT) services that create a new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, an array antenna, and so forth. Application of the cloud RAN as the Big Data processing technology may also be an example of convergence of the 5G technology and the IoT technology.

As described above, various services may be provided along with development of a mobile communication system, thus necessitating a way to effectively provide such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively providing a service in a mobile communication system.

Additional aspects will be set forth in part in the description which follows and, in part, will be apparent from the description, or may be learned by practice of the presented embodiments.

In accordance with an aspect of the disclosure a method, performed by a user equipment (UE), of controlling a profile is provided. The method includes receiving a remote profile management command regarding a target profile from a profile server, determining whether an enabled profile exists, verifying whether profile owner information of the target profile corresponds to profile owner information or sub-owner information of the enabled profile, based on a result of the determination, and selectively executing the remote profile management command based on a result of the verification.

The sub-owner information may include information of a profile owner capable of implicitly disabling the enabled profile.

When the sub-owner information corresponding to the enabled profile does not exist and an owner of the enabled profile and an owner of the target profile are different from each other, the enabled profile may not be capable of being disabled implicitly.

The selectively executing of the remote profile management command based on the result of the verification may include disabling the enabled profile when profile owner information of the target profile corresponds to the profile owner information or the sub-owner information of the enabled profile.

The disabling may include immediately disabling the enabled profile or marking the enabled profile as to be disabled to disable the enabled profile after performing a predetermined operation.

The method may further include enabling the target profile.

The enabling may include immediately enabling the target profile or marking the target profile as to be enabled to enable the target profile after performing a predetermined operation.

The operation may include a refresh operation or a reset operation.

The selectively executing of the remote profile management command based on the result of the verification may include rejecting the remote profile management command when the profile owner information of the target profile does not correspond to the profile owner information or the sub-owner information of the enabled profile.

The method may further include generating an error code indicating profile owner information mismatch.

In accordance with another aspect of the disclosure, a user equipment (UE) for controlling a profile is provided. The UE includes a transceiver and at least one processor coupled with the transceiver and configured to receive a remote profile management command regarding a target profile from a profile server, determine whether an enabled profile exists, verify whether profile owner information of the target profile corresponds to profile owner information or sub-owner information of the enabled profile, based on a result of the determination, and selectively execute the remote profile management command based on a result of the verification.

The at least one processor may be further configured to disable the enabled profile when profile owner information of the target profile corresponds to the profile owner information or the sub-owner information of the enabled profile.

The at least one processor may be further configured to immediately disable the enabled profile or marking the enabled profile as to be disabled to disable the enabled profile after performing a predetermined operation.

The at least one processor may be further configured to enable the target profile.

The at least one processor may be further configured to immediately enable the target profile or marking the target profile as to be enabled to enable the target profile after performing a predetermined operation.

The at least one processor may be further configured to reject the remote profile management command when the profile owner information of the target profile does not correspond to the profile owner information or the sub-owner information of the enabled profile.

The at least one processor may be further configured to generate an error code indicating profile owner information mismatch.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
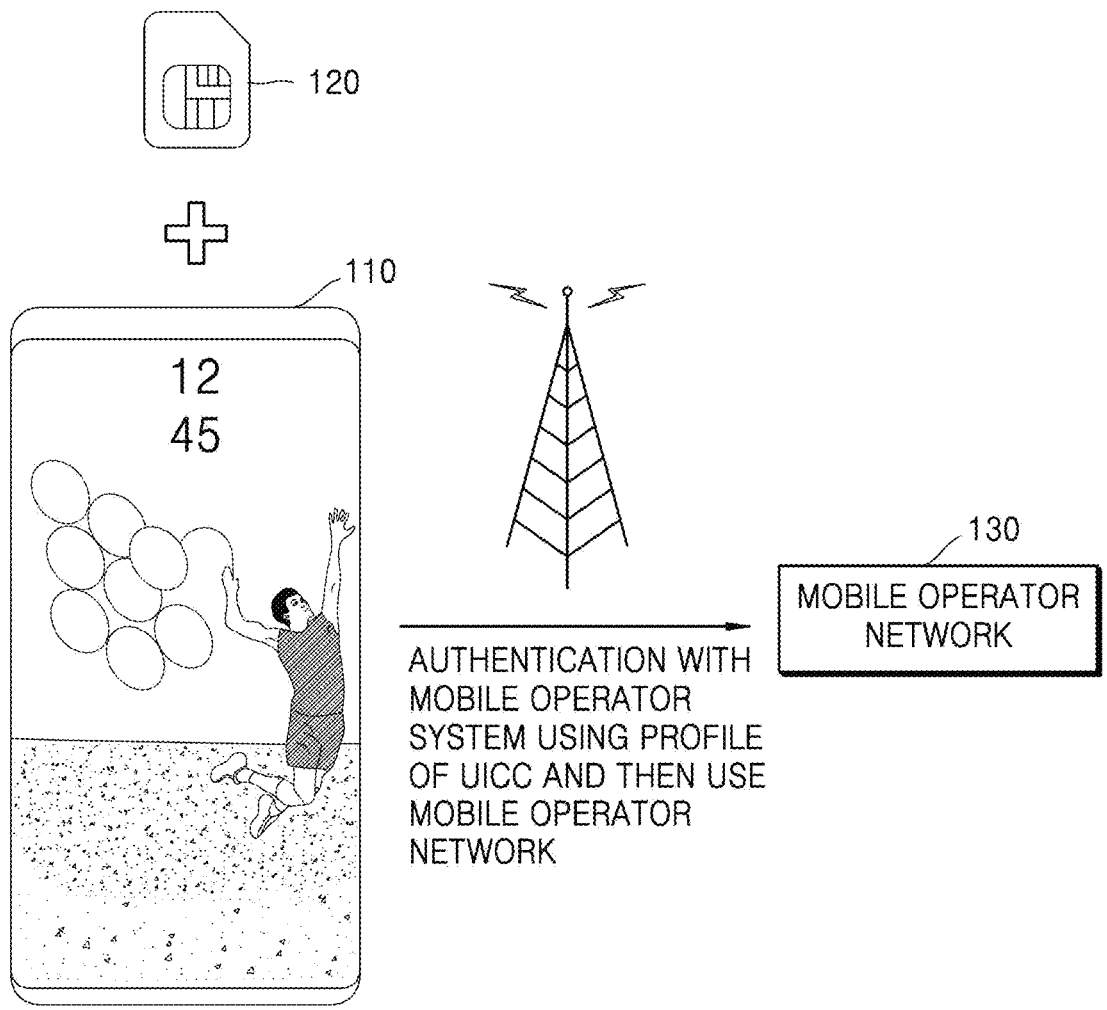
FIG. 1 is a diagram for describing a method, performed by a user equipment (UE), of connecting to a mobile communication network by using a universal integrated circuit card (UICC) having a fixed profile mounted thereon, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments of the disclosure, but may be implemented in various ways, and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment of the disclosure, the term "unit", as used herein, denotes a software or hardware component, such as a field programmable gate array (FPGA) or application specific integrated circuit (ASIC), which performs certain tasks. However, the meaning of "unit" is not limited to software or hardware. "unit" may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "unit(s)" may be combined into fewer components and "unit(s)" or further separated into additional components and "unit(s)". In addition, components and "unit(s)" may be implemented to execute one or more central processing units (CPUs) in a device or a secure multimedia card.

Particular terms used in the following description are provided to help with the understanding of the disclosure, and the use of the particular terms may be changed without departing from the technical spirit of the disclosure.

A universal integrated circuit card (UICC) is a smart card inserted into a mobile communication UE, etc., for use, and is also referred to as a UICC card. The UICC may include an access control module for accessing a network of a mobile operator. Examples of the access control module may include a universal subscriber identity module (USIM), a subscriber identity module (SIM), an Internet protocol multimedia service identity module (ISIM), etc. A UICC including the USIM is generally called a USIM card. Likewise, a UICC including a SIM module is generally called a SIM card.

Thus, the terms disclosed in the disclosure, "SIM card", "UICC card", "USIM card", and "UICC including an ISIM" will be used having the same meaning. Technical applications with respect to the SIM card may also be equally applied to a USIM card, an ISIM card, or a general UICC card.

The SIM card stores personal information of a mobile communication subscriber and performs subscriber authentication and traffic security key generation when accessing the mobile communication network, enabling secure mobile communication.

The SIM card is manufactured as a dedicated card for a particular mobile operator at the request of the mobile operator in card manufacturing at the time of proposing the disclosure, and authentication information for network access of the mobile operator, e.g., a universal subscriber identity module (USIM) application, an international mobile subscriber identity (IMSI), a K value, an OPc value, etc., may be mounted in advance in the SIM card which is then released. The manufactured SIM card is delivered to the mobile operator who then provides the SIM card to a subscriber and performs management, such as installation, modification, deletion, etc., with respect to an application in the UICC card by using a technique such as Over the Air (OTA) technology when needed. The subscriber inserts the UICC card into the subscriber's mobile communication user equipment (UE) to use a network and an application service of the operator, and when exchanging the UE with a new UE, the subscriber may use the authentication information, phone numbers, personal phonebook, and so forth stored in the UICC card in the new UE, by moving and inserting the UICC card to and into the new UE from the existing UE.

However, with the SIM card, it may be troublesome for a mobile communication UE user to be provided with a service of a different mobile operator. The mobile communication UE user may encounter the inconvenience of having to physically obtain the SIM card so as to be provided with a service from a mobile operator. For example, to be provided with a local mobile communication service when the user goes on a trip to another country, the user has to obtain a local SIM card. A roaming service, despite mitigating the inconvenience to some extent, may charge a relatively high fee and may not be provided unless contact between mobile operators is made.

Such an inconvenience may be largely solved by remotely downloading and installing the SIM module in the UICC card. The SIM module of a mobile communication service to be used may be downloaded in the UICC card at a user-desired time. For the UICC card, a plurality of SIM modules may be downloaded and installed, and one of them may be selected and used. The UICC card may or may not be fixed in the UE. The UICC fixedly used in the UE is referred to as an embedded UICC (eUICC) that is generally used by being fixed in the UE and may mean a UICC card capable of remotely downloading and selecting a SIM module. In the following disclosure, the UICC card capable of remotely downloading and selecting the SIM module will be collectively referred to as an eUICC. That is, out of UICC cards capable of remotely downloading and selecting the SIM module, the UICC card fixed or not fixed in the UE will be collectively referred to as an eUICC. Downloaded SIM module information will be collectively referred to as an eUICC profile, more briefly, a profile.

Hereinbelow, terms used in the specification will be described in more detail.

In the disclosure, a UICC, which is a smart card inserted into a mobile communication UE for use, means a chip in which personal information such as network access authentication information, a phonebook, and a short messaging service (SMS) of a mobile communication subscriber is stored so as to allow secure use of mobile communication through subscriber authentication and traffic security key generation at the time of access to a mobile communication network such as the Global System for Mobile Communications (GSM), Wideband Code Division Multiple Access (WCDMA), Long-Term Evolution (LTE), etc. In the UICC, a communication application such as a SIM, a USIM, an ISIM, etc. is mounted depending on a type of a mobile communication network accessed by a subscriber, and a higher-level security function for installing various applications such as an electronic wallet, ticketing, an electronic passport, etc. may be provided.

In the disclosure, the eUICC is a security module that is not of a removable type that may be inserted into and removed from the UE, but is in the form of a chip embedded in the UE. The eUICC may download and install a profile by using the OTA technology. That is, the eUICC may be a UICC capable of downloading and installing a profile.

In the disclosure, a method of downloading and installing a profile in the eUICC by using the OTA technology may be applied to a removable UICC that may be inserted into and removed from the UE. An embodiment of the disclosure may be applied to the UICC that may download and install a profile using the OTA technology.

In the disclosure, the term "UICC" may be interchangeably used with the SIM, and the term "eUICC" may be interchangeably used with the eSIM. In the disclosure, a profile may mean that an application, a file system, an authentication key, and so forth, stored in the UICC, are packaged in the form of software. In the disclosure, a USIM profile may have the same meaning as the profile or may mean that information included in an USIM application in the profile is packaged in the form of software.

In the disclosure, an operation in which the UE enables a profile may mean an operation of changing a state of the profile into an enabled state so that the UE may be provided with a communication service through a mobile operator that provides the profile. The profile in the enabled state may be expressed as an "enabled profile".

In the disclosure, when one or more profiles are installed in the UE, the number of profiles in the enabled state at the time of a particular point in time in the UE may be limited. In various embodiments of the disclosure, it is assumed that a profile in the enabled state is limited to one, but a plurality of profiles may be in the enabled state, and for a UE where the plurality of profiles are in the enabled state, various embodiments of the disclosure may be correspondingly applied.

In the disclosure, an operation in which the UE disables a profile may mean an operation of changing a state of the profile into a disabled state so that the UE may not be provided with a communication service through a mobile operator that provides the profile. The profile in the disabled state may be expressed as a "disabled profile".

In the disclosure, an operation in which the UE deletes a profile may mean an operation of changing a state of the profile into a deleted state so that the UE may not enable or disable the profile any longer. The profile in the deleted state may be expressed as a "deleted profile".

In the disclosure, an operation, performed by the UE, of enabling, disabling, or deleting a profile may mean an operation of marking the profile as to be enabled, disabled, or deleted and changing the profile into the enabled state, the disabled state, or the deleted state after the UE or the UICC of the UE performs a particular operation, instead of immediately changing the state of the profile into the enabled state, the disabled state, or the deleted state. The particular operation performed by the UE or the UICC of the UE may be, for example, execution of a REFRESH or RESET command. The operation of marking a particular profile as a scheduled state (i.e., to be enabled, to be disabled, or to be deleted) is not limited to marking one profile as one scheduled state, and may include marking one or more profiles as a particular scheduled state, respectively, one profile as one or more scheduled states, or one or more profiles as one or more scheduled states, respectively. When one or more scheduled states are marked for a profile, two marks may be integrated into one. For example, when a profile is marked as to be disabled and to be deleted, the profile may be integrally marked as to be disabled and deleted.

In the disclosure, a profile providing server may generate a profile, encrypt the generated profile, generate a profile remote management instruction, or encrypt the generated profile remote management instruction. The profile providing server may be expressed as at least one of subscription manager data preparation (SM-DP), subscription manager data preparation plus (SM-DP+), an off-card entity of a profile domain, a profile encryption server, a profile generation server, a profile provisioner (PP), a profile provider, or a profile provisioning credentials (PPC) holder.

In the disclosure, a profile managing server may be expressed as at least one of subscription manager secure routing (SM-SR), subscription manager secure routing plus (SM-SR+), an off-card entity of an eUICC profile manager, a profile management credentials (PMC) holder, or an eUICC manager (EM).

In the disclosure, when the profile providing server is indicated, it may collectively indicate integration of a function of the profile managing server. Thus, in various embodiments of the disclosure, an operation of the profile providing server may be performed by the profile managing server. Likewise, an operation of describing the profile managing server or the SM-SR may also be performed by the profile providing server. In addition, in the specification of the disclosure, the profile providing server or the profile managing server may be expressed as a profile server. The profile server may be one of the profile providing server or the profile managing server, or may include both the profile providing server and the profile managing server.

In the disclosure, an activation relay server may be expressed as at least one of a subscription manager discovery service (SM-DS), a discovery service (DS), a root activation relay server (root SM-DS), or an alternative activation relay server (alternative SM-DS). The activation relay server may receive an event registration request (Register Event Request or Event Register Request) from one or more profile providing servers or activation relay servers. The one or more activation relay servers may be mixedly used, and in this case, a first activation relay server may receive an event registration request from a second activation relay server as well as from the profile providing server. The profile server may include the activation relay server.

In the disclosure, the profile providing server and the activation relay server may be referred to as a "remote SIM provisioning (RSP) server". The RSP server may be expressed as a subscription manager (SM)-XX.

The term "terminal" used in the disclosure may refer to a mobile station (MS), a user equipment (UE), a user terminal (UT), a wireless terminal, an access terminal (AT), a terminal, a subscriber unit (SU), a subscriber station (SS), a wireless device, a wireless communication device, a wireless transmit/receive unit (WTRU), a mobile node, a mobile unit, or other devices. Various embodiments of the disclosure of the UE may include a cellular phone, a smart phone having a wireless communication function, a personal digital assistant (PDA) having a wireless communication function, a wireless modem, a portable computer having a wireless communication function, a photographing device having a wireless communication function, such as a digital camera, a gaming device having a wireless communication function, a music storage and play home appliance having a wireless communication function and an Internet home appliance capable of wireless Internet connection and browsing, and portable units or UEs having integrated therein combinations of such functions. The UE may also include, but is not limited to, a machine-to-machine (M2M) UE and a machine type communication (MTC) UE/device. In the disclosure, the UE may be referred to as an electronic device.

In the disclosure, an electronic device may include a UICC capable of downloading and installing a profile. When the UICC is not included in the electronic device, the UICC, which is physically separated from the electronic device, may be inserted into and connected with the electronic device. For example, the UICC may be inserted into the electronic device in the form of a card. The electronic device may include a UE, and in this case, the UE may be a UE including a UICC capable of downloading and installing a profile. The UICC may be included in the UICC, and when the UICC is separated from the UE, the UICC may be inserted into the UE, thus being connected with the UE. The UICC, which is capable of downloading and installing the profile, may be referred to as, for example, the eUICC.

In the disclosure, the UE or the electronic device may include software or an application may be installed in the UE or the electronic device to control the UICC or the eUICC. The software or the application may be referred to as, e.g., a local profile assistant (LPA).

In the disclosure, a profile separator may be referred to as a profile identification (ID), an integrated circuit card ID (ICCID), a matching ID, an event ID, an activation code, an activation code token, a command code, a command code token, or a factor matching an ISD-P or profile domain (PD). The profile ID may indicate a unique ID of each profile. The profile separator may include an address of a profile providing server (SM-DP+) capable of indexing a profile.

In the disclosure, the eUICC ID may be a unique ID of the eUICC included in the UE, and may be referred to as an EID. When a provisioning profile is previously mounted in the eUICC, the eUICC ID may be a profile ID of the provisioning profile. When the UE and an eUICC chip are not separated as in an embodiment of the disclosure, the eUICC ID may be a UE ID. The eUICC ID may also be a specific secure domain of the eUICC chip.

In the disclosure, a profile container may be referred to as a profile domain. A profile container may be a security domain.

In the disclosure, an application protocol data unit (APDU) may be a message for interworking of the UE with the eUICC. The APDU may be a message for interworking of a profile provisioner (PP) or a profile manager (PM) with the eUICC.

In the disclosure, profile provisioning credentials (PPC) may be a means used to perform mutual authentication between the profile providing server and the eUICC, profile encryption, and signing. The PPC may include one or more of a symmetric key, Rivest Shamir Adleman (RSA) certificate and private key, elliptic curved cryptography (ECC) certificate and private key, root certification authority (CA), and a certificate chain. When the profile providing server is provided in plural, a different PPC for each of a plurality of profile providing servers may be stored in the eUICC or may be used.

In the disclosure, Profile Management Credentials (PMC) may be a means used to perform mutual authentication between the profile managing server and the eUICC, transmission data encryption, and signing. The PMC may include one or more of a symmetric key, RSA certificate and personal key, ECC certificate and personal key, root CA, and a certificate chain. When the profile managing server is provided in plural, a different PMC for each of a plurality of profile managing servers may be stored in the eUICC or may be used.

In the disclosure, AID may indicate an application identifier. This value may be a separator that separates different applications in the eUICC.

In the disclosure, an event (Event) may be a term that collectively refers to profile download (Profile Download), remote profile management (Remote Profile Management), or a management/processing instruction of another profile or the eUICC. The event (Event) may be referred to as a remote SIM provisioning operation, an RSP operation (RSP Operation), or an event record (Event Record), and each event (Event) may be referred to as data including at least one of a corresponding event identifier (Event Identifier, Event ID, or EventID), a matching identifier (Matching Identifier, Matching ID, or MatchingID), or an address (FQDN, an IP address, or a uniform resource locator (URL) of the profile providing server (SM-DP+) or the activation relay server (SM-DS) having the event stored therein. Profile download (Profile Download) may be used interchangeably with profile installation (Profile Installation). An event type (Event Type) may be used as a term indicating whether a particular event is profile download or remote profile management (e.g., deletion, enabling, disabling, replacement, update, etc.) or another profile or an eUICC management/process command, and may be referred to as an operation type (Operation Type or OperationType), an operation class (Operation Class or OperationClass), an event request type (Event Request Type), an event class (Event Class), an event request class (Event Request Class), etc.

In the disclosure, a profile package (Profile Package) may be used interchangeably with a profile or used as a term indicating a data object of the profile, and may be referred to as a profile tag/length/value (TLV) (Profile TLV) or a profile package TLV (Profile Package TLV). When the profile package is encrypted using an encryption parameter, the profile package may be referred to as a protected profile package (Protected Profile Package (PPP)) or Protected Profile Package TLV (PPP TLV). When the profile package is encrypted using an encryption parameter that is decryptable only by a particular eUICC, the profile package may be referred to as a bound profile package (Bound Profile Package (BPP)) or Bound Profile Package TLV (BPP TLV). The profile package TLV may be a data set expressing information configuring a profile in the form of a TLV.

In the disclosure, a remote profile management (RPM) may be referred to as profile remote management, remote management, a remote management command, a remote command, an RPM package, a profile remote management package, a remote management package, a remote management command package, or a remote command package. The RPM may be used to change a state (enabled, disabled, or deleted) of a particular profile or update contents of the profile (e.g., a nickname of the profile (Profile Nickname), profile summary information (Profile Metadata), etc.). The RPM may include one or more remote management commands, and a profile that is a target for each remote management command may be the same or different for each remote management command.

In the disclosure, a certificate or a digital certificate may indicate a digital certificate used in mutual authentication based on an asymmetric key including a pair of a public key (PK) and a secret key (SK). Each certificate may include one or more PKs, a public key identifier (PKID) corresponding to each public key, a certificate issuer ID of a certificate issuer (CI) issuing the certificate, and a digital signature. The certificate issuer may be referred to as a Certification Issuer, a Certification Authority, a CA, etc. In the disclosure, a PK and a public key ID (PKID) may be used as the same meaning indicating a PK, a certificate including the PK, a part of the PK, a part of the certificate including the PK, an operation result of the PK (e.g., a hash value), an operation result of the certificate including the PK (e.g., a hash value), an operation result of the part of the PK (e.g., a hash value), an operation result of the part of the certificate including the PK (e.g., a hash value), or a storage space storing the listed data.

In the disclosure, when certificates (primary certificates) issued by one CI are used to issue other certificates (secondary certificates) or the secondary certificates are used to connectively issue tertiary or higher-degree certificates, a correlation between corresponding certificates may be referred to as a certificate chain or a certificate hierarchy, and in this case, a CI certificate used in initial certificate issuance may be referred to as a root of a certificate, the highest-layer certificate, a root CI, a root CI certificate, a root CA, a root CA certificate, etc.

In the disclosure, a mobile operator may indicate an operator providing a communication server to the UE, and may indicate a business supporting system (BSS) of the mobile operator, an operational supporting system (OSS), a point of sale (PoS) terminal, and other IT systems. In the disclosure, a mobile operator may be used as a term referring to not only a particular operator providing a communication service, but also to a group, an association, or a consortium of one or more mobile operators, or a representative of the group, the association, or the consortium. In the disclosure, the mobile operator may be referred to as an operator (OP or Op.), a mobile network operator (MNO), a service provider (SP), a profile owner (PO), etc., and each mobile operator may set at least one of a name or an object identifier (OID) of the mobile operator or may be assigned with the same. When a mobile operator indicates a group, association, or agency of one or more operators, a name or a unique ID of the group, association, or agency may be a name or a unique ID shared among all companies belonging to the group or association or all companies cooperating with the agency.

In the disclosure, AKA may indicate authentication and key agreement, and may indicate an authentication algorithm for connection to 3GPP and 3GPP2 networks.

In the specification, K (or K value) may an encryption key value stored in the eUICC used for an AKA authentication algorithm.

In the disclosure, OPc may be a parameter value stored in the eUICC used in the AKA authentication algorithm.

In the disclosure, NAA, which is a network access application, may be an application stored in the UICC to connect to a network, such as a USIM or ISIM. The NAA may be a network access module.

In the disclosure, when it is determined to make the subject matter of the disclosure unclear, the detailed description of known functions or configurations may be omitted.

Hereinbelow, a description will be made of various embodiments of the disclosure of a method and apparatus for generating and managing a list of mobile operators capable of remotely managing a profile, a method and apparatus for downloading and installing a communication service in a UE in a communication system for communication connection, and a method and apparatus for downloading, installing, and managing a profile online in a communication system.

FIG. 1 is a diagram for describing a method, performed by a UE, of connecting to a mobile communication network by using a UICC having a fixed profile mounted thereon, according to an embodiment of the disclosure.

Referring to FIG. 1, a UICC 120 may be inserted into a UE 110. For example, the UICC 120 may be a removable type and may be previously included in the UE 110.

The fixed profile mounted in the UICC may mean that access information allowing access to a particular mobile operator is fixed. For example, the access information may include an IMSI that is a subscriber separator and a K or Ki value needed to authenticate a network together with the subscriber separator.

The UE 110 may perform authentication with an authentication processing system (e.g., a home location register (HLR) or an authentication center (AuC)) of a mobile operator by using the UICC 120. For example, an authentication process may be an AKA process. When the UE 110 succeeds in authentication, the UE 110 may use a mobile communication service such as use of a phone or mobile data by using a mobile communication network 130 of a mobile communication system.

Figure 2:
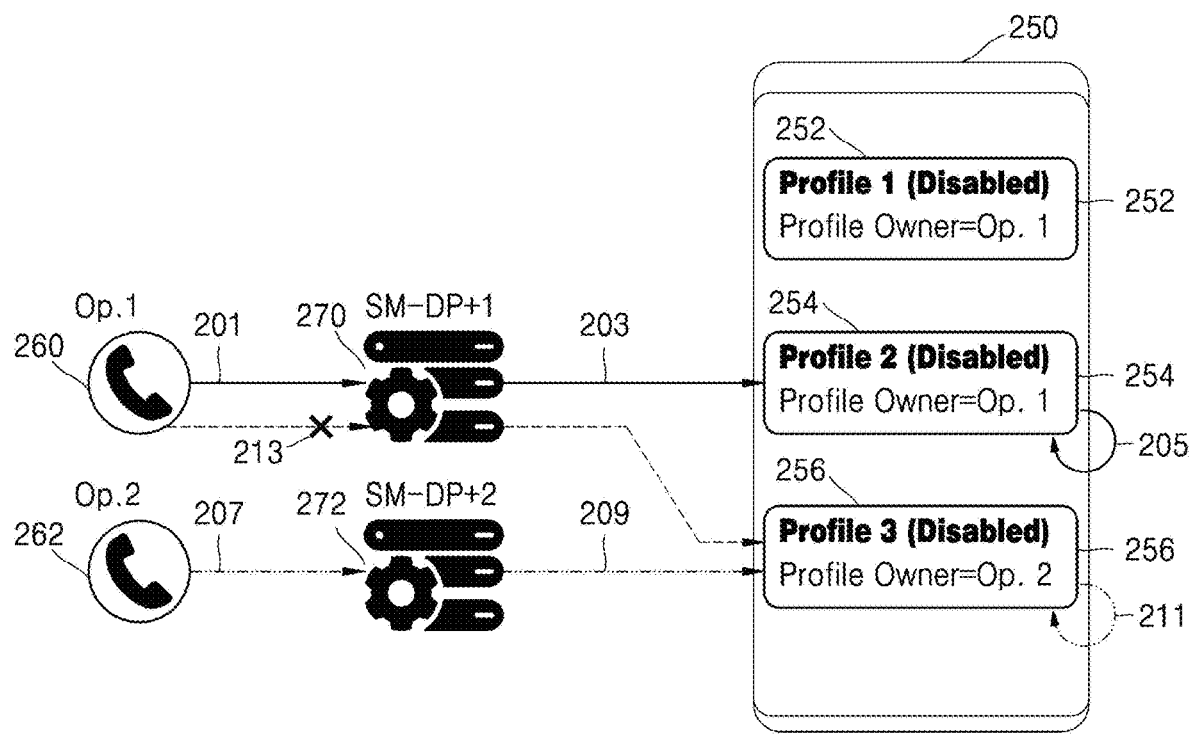
FIG. 2 illustrates an example for describing a procedure in which a mobile operator remotely manages a profile in a UE through a profile server when there is no profile enabled in the UE, according to an embodiment of the disclosure.

FIG. 2 illustrates an example for describing a procedure in which first and second mobile operators and remotely manage first through third profiles in a UE through first and second profile servers and when any profile is not in an enabled state in the UE 250, according to an embodiment of the disclosure.

Referring to FIG. 2, the UE 250 may be a UE having an eSIM mounted therein. In the UE 250, one or more profiles may be installed. Referring to FIG. 2, FIG. 2 shows a case where a first profile 252, a second profile 254, and a third profile 256 are installed in the UE 250, and at least one profile is not in the enabled state.

In FIG. 2, the first and second mobile operators 260 and 262 may own one or more profiles, and when a profile owned by the first or second mobile operator 260 or 262 is in the enabled state, the first or second mobile operator 260 or 262 may provide a communication service to the UE 250. For example, in FIG. 2, the first mobile operator 260 may own the first profile 252 and the second profile 254, and the second mobile operator 262 may own the third profile 256. Such profile owner (Profile Owner) information may be included in a profile or profile summary information (Profile Metadata), and may be expressed as a name or a unique identifier (Object Identifier (OID)) of a corresponding mobile operator. In the drawing of the disclosure, for convenience, a name expressed as a character string (Op.1 or Op. 2) indicates a profile owner, but the profile owner may also be indicated by a unique ID (OID, e.g., "1.10.42.213.3") expressed as a character string as described above. Additionally, an implicit disable counter indicating the allowable number of times a profile may be implicitly disabled by a profile owner may be indicated, together with the profile owner information, in the profile. The implicit disable and the implicit disable counter will be described in more detail with reference to FIG. 5. In addition, while one profile owner is illustrated in each profile in the drawing of the disclosure, one or more profile owners may also be defined in each profile. When a profile owner is designated in plural, an implicit disable counter for each profile owner may also be designated in plural.

In FIG. 2, first and second profile servers 270 and 272 may receive requests from the mobile operators 260 and 262, generate a profile remote management command, and deliver the same to the UE 250. In this case, the profile server may be exclusively connected with a particular mobile operator. For example, in the drawing, the first mobile operator 260 may be connected with the first profile server 270, and the second mobile operator 262 may be connected with the second profile server 272.

Referring to FIG. 2, in operation 201, the first mobile operator 260 may transmit a request for remote management of the second profile 254 owned by the first mobile operator 260 to the first profile server 270. For example, operation 201 may be an operation of requesting enabling of the second profile 254 currently in a disabled state in the UE 250. According to some embodiments of the disclosure, operation 201 may use an "RPM Order" message.

In operation 203, the first profile server 270 may determine whether the first mobile operator 260 is a profile owner of the second profile 254. To this end, the first profile server 270 may manage an OID of the first mobile operator 260 and information of all profiles owned by the first mobile operator 260, and identify and determine a profile owner of each profile. When the first profile server 270 determines that the first mobile operator 260 is an owner of the second profile 254, the first profile server 270 may generate a remote management command for the second profile 254 and transmit the same to the UE 250. For example, the remote management command may be a command enabling the second profile 254. According to some embodiments of the disclosure, operation 203 may use at least one of an "Initiate Authentication" message or an "Authenticate Client" message.

The aforementioned operation of determining whether a mobile operator is a profile owner of a profile may be referred to as profile owner check. The profile owner check is not necessarily performed by a profile server (e.g., in operation 203); this operation may be performed by the UE 250 instead or in parallel (e.g., in operation 205). While it is described in embodiments of the disclosure that the profile owner check is performed by the profile server, the profile owner check may be replaced with or performed in parallel with a corresponding operation of the UE. The profile owner check performed by the UE will be described in detail with reference to operations 305 or 311 of FIGS. 3A to 3C. When one or more profile owners of a profile are set, the profile owner check may be an operation of determining whether a mobile operator is included in a profile owner list of the profile.

In operation 205, the UE 250 may enable the second profile 254 and receive a communication service through the first mobile operator. As shown in FIG. 2, when no profile is enabled in the UE 250, the UE may immediately enable the second profile 254 in operation 205.

In operation 207, the second mobile operator 262 may transmit a request for remote management of the third profile 256 owned by the second mobile operator 262 to the second profile server 272. For example, operation 207 may be an operation of requesting enabling of the third profile 256 currently in a disabled state in the UE 250. According to some embodiments of the disclosure, operation 207 may use an "RPM Order" message.

In operation 209, the second profile server 272 may determine whether the second mobile operator 262 is a profile owner of the third profile 256. The second profile server 272 may manage an OID of the second mobile operator 262 and information of all profiles owned by the second mobile operator 262, and identify and determine a profile owner. When the second profile server 272 determines that the second mobile operator 262 is an owner of the third profile 256, the second profile server 272 may generate a remote management command for the third profile 256 and transmit the same to the UE 250. For example, the remote management command may be a command enabling the third profile 256. According to some embodiments of the disclosure, operation 209 may use at least one of an "Initiate Authentication" message or an "Authenticate Client" message.

In operation 211, the UE 250 may enable the third profile 256 and receive a communication service through the second mobile operator. As shown in FIG. 2, when no profile is enabled in the UE 250, the UE may immediately enable the second profile 254 in operation 211.

In operation 203 or 209, the first profile server 270 or the second profile server 272 may determine whether the mobile operator 260 or 262 requesting remote management of a profile has a remote management authority for the profile. When a mobile operator having no remote management authority transmits a request for profile remote management, the profile server may reject the request. For example, as in operation 213, when the first mobile operator 260 transmits a request for remote management of the third profile 256 owned by the second mobile operator 262 to the first profile server 270, the first profile server 270 may reject the request of the first mobile operator 260. When the UE 250 performs the profile owner check, rejection of the request for remote management may be performed by the UE 250 (not shown).

Figure 3A:
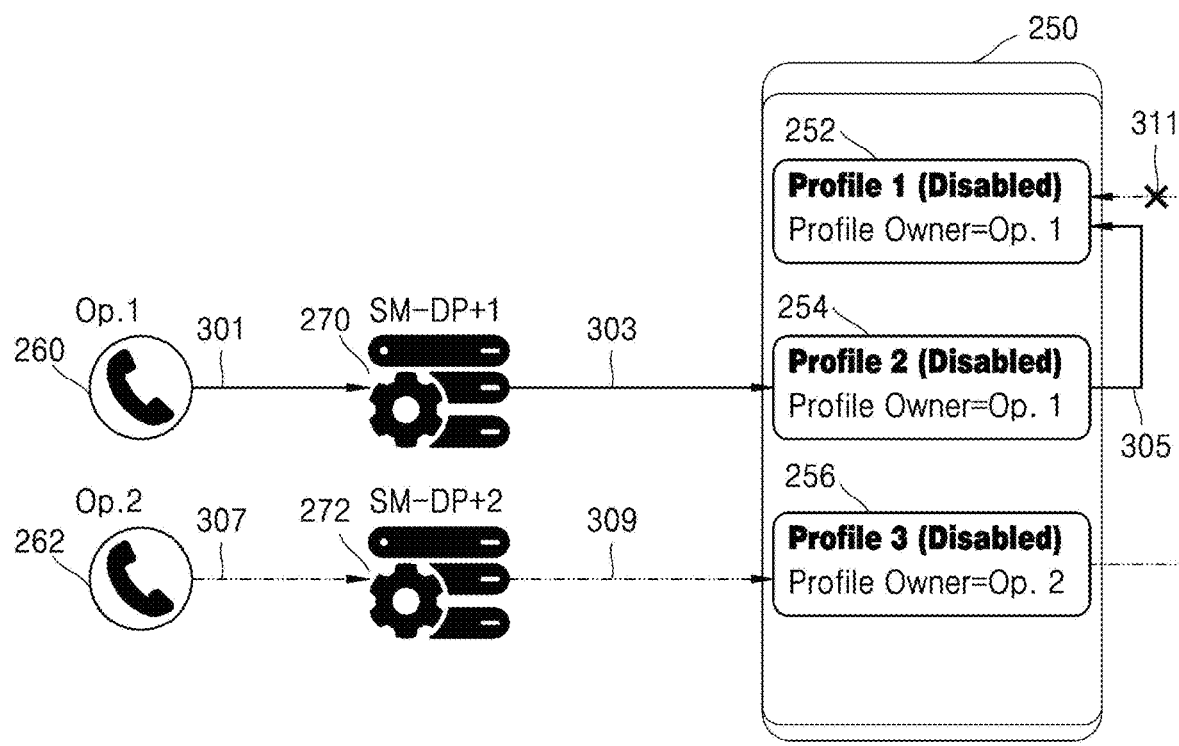
FIG. 3A illustrates an example for describing a procedure in which a mobile operator remotely manages a profile in a UE through a profile server when there is an enabled profile in the UE, according to an embodiment of the disclosure.
Figure 3B:
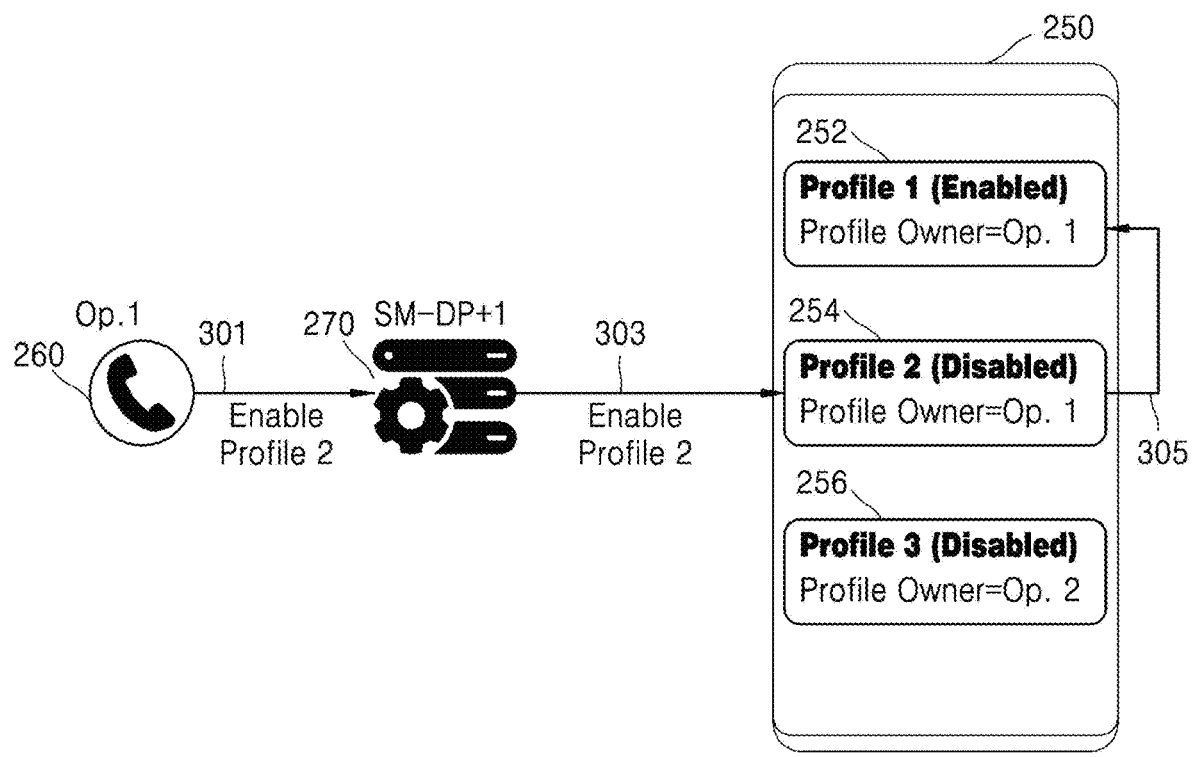
FIG. 3B illustrates an example for describing a procedure in which a mobile operator remotely manages a profile in a UE through a profile server when there is an enabled profile in the UE, according to an embodiment of the disclosure.
Figure 3C:
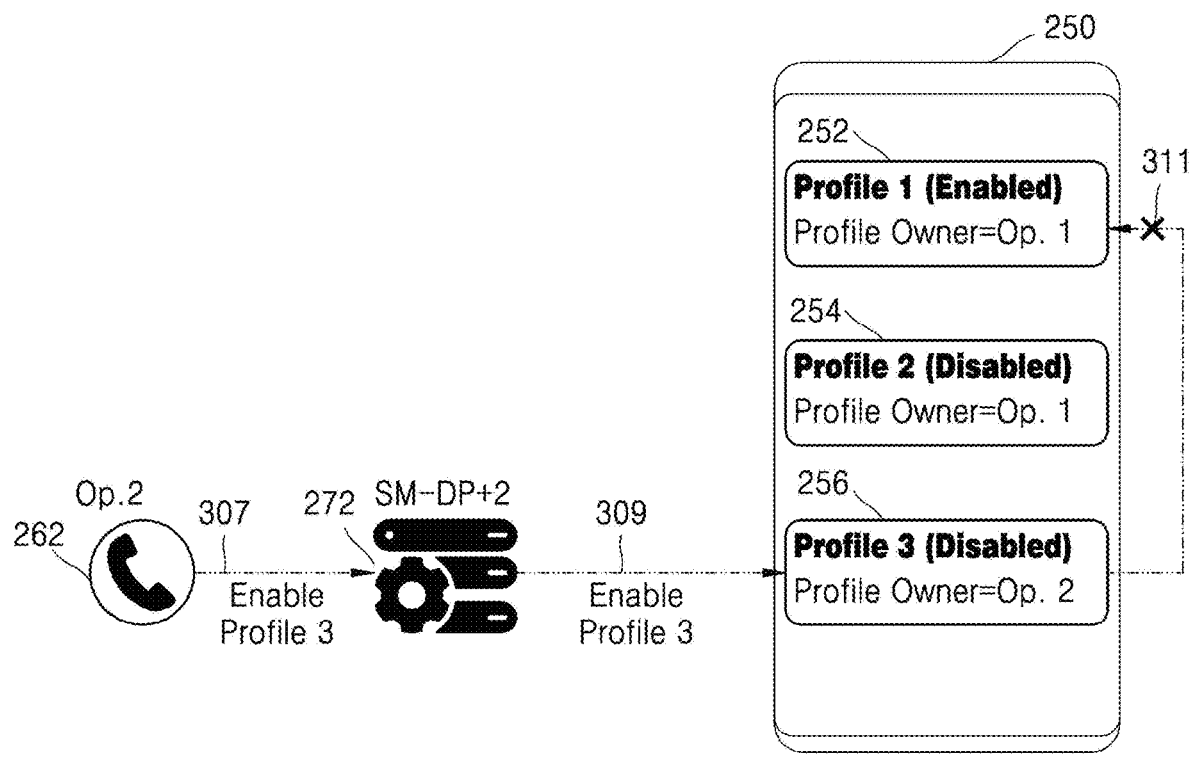
FIG. 3C illustrates an example for describing a procedure in which a mobile operator remotely manages a profile in a UE through a profile server when there is an enabled profile in the UE, according to an embodiment of the disclosure.

FIGS. 3A, 3B, and 3C show an example for describing a procedure in which the first and second mobile operators 260 and 262 remotely manage the second profile 254 or the third profile 256 in the UE 250 through the first and second profile servers 270 and 272 when the first profile 252 is in the enabled state in the UE 250, according to various embodiments of the disclosure.

Referring to FIGS. 3B and 3C show a case where the first profile 252, the second profile 254, and the third profile 256 are installed in the UE 250, among which the first profile 252 is in the enabled state. FIG. 3A illustrates FIGS. 3B and 3C as one drawing. Settings of each profile and a mobile operator who owns the profile are referred to in the description made with reference to FIG. 2.

Referring to FIG. 3B, in operation 301, the first mobile operator 260 may transmit a request for remote management of the second profile 254 owned by the first mobile operator 260 to the first profile server 270. For example, operation 301 may be an operation of requesting enabling of the second profile 254 currently in a disabled state in the UE 250. According to some embodiments of the disclosure, operation 301 may use an "RPM Order" message.

In operation 303, the first profile server 270 may determine whether the first mobile operator 260 is a profile owner of the second profile 254. The first profile server 270 may manage an OID of the first mobile operator 260 and information of all profiles owned by the first mobile operator 260, and identify and determine a profile owner of each profile. When the first profile server 270 determines that the first mobile operator 260 is the owner of the second profile 254, the first profile server 270 may generate a remote management command for the second profile 254 and transmit the same to the UE 250. For example, the remote management command may be a command enabling the second profile 254. According to some embodiments of the disclosure, operation 303 may use at least one of an "Initiate Authentication" message or an "Authenticate Client" message.

In operation 305, the UE 250 may attempt enabling of the second profile 254. Unlike in operation 205 of FIG. 2 where no profile in the UE 250 is in the enabled state and thus the second profile 254 may be immediately enabled, when the first profile 252 in the UE 250 is in the enabled state, the UE 250 may compare (verify) a profile owner of the currently enabled first profile 252 with a profile owner of the second profile 254 that is a comparison target to determine whether at least one profile owner of the first profile 252 is identical to at least one profile owner of the second profile 254, in operation 305. FIG. 3B shows a case where the profile owner of the first profile 252 and the profile owner of the second profile 254 are identical to each other as the first mobile operator 260, such that the UE 250 may enable the second profile 254 immediately after disabling of the first profile 252 and may be provided with a communication service through the first mobile operator 260. As such, when the first profile 252 is disabled by an enable remote management command for the second profile 254 of the identical profile owner without a separate disable remote management command for the first profile 252, the disabling of the first profile 252 may be referred to as "implicit disable".

Referring to FIG. 3C, in operation 307, the second mobile operator 262 may transmit a request for remote management of the third profile 256 owned by the second mobile operator 262 to the second profile server 272. For example, operation 307 may be an operation of requesting enabling of the third profile 256 currently in a disabled state in the UE 250. According to some embodiments of the disclosure, operation 307 may use an "RPM Order" message.

In operation 309, the second profile server 272 may determine whether the second mobile operator 262 is a profile owner of the third profile 256. The second profile server 272 may manage an OID of the second mobile operator 262 and information of all profiles owned by the second mobile operator 262, and identify and determine a profile owner. When the second profile server 272 determines that the second mobile operator 262 is an owner of the third profile 256, the second profile server 272 may generate a remote management command for the third profile 256 and transmit the same to the UE 250. For example, the remote management command may be a command enabling the third profile 256. According to some embodiments of the disclosure, operation 309 may use at least one of an "Initiate Authentication" message or an "Authenticate Client" message.

In operation 311, the UE 250 may attempt enabling of the third profile 256. Unlike in operation 211 of FIG. 2 where any profile in the UE 250 is not in the enabled state and thus the third profile 256 may be immediately enabled, when the first profile 252 in the UE 250 is in the enabled state, the UE 250 may compare a profile owner of the currently enabled first profile 252 with a profile owner of the third profile 256 that is a comparison target to determine whether at least one profile owner of the currently enabled first profile 252 is identical to at least one profile owner of the third profile 256, in operation 311. FIG. 3C shows a case where the profile owner of the first profile 252 is the first mobile operator 260, but the profile owner of the third profile 256 is the second mobile operator 262, and the UE 250 may reject enabling of the third profile 256, maintain the enabled state of the first profile 252, and be provided with a communication service through the first mobile operator 260.

Referring to FIGS. 3A, 3B and 3C, when a profile is enabled through a remote management command as in operation 305 or 311, the UE may compare a profile owner of a target profile to be enabled by the remote management command with a profile owner of a currently enabled profile to determine whether at least one profile owner of the target profile to be enabled is identical with at least one profile owner of the currently enabled profile. This operation (together with operation 203 of FIG. 2) may also be referred to as a profile owner check.

Figure 4:
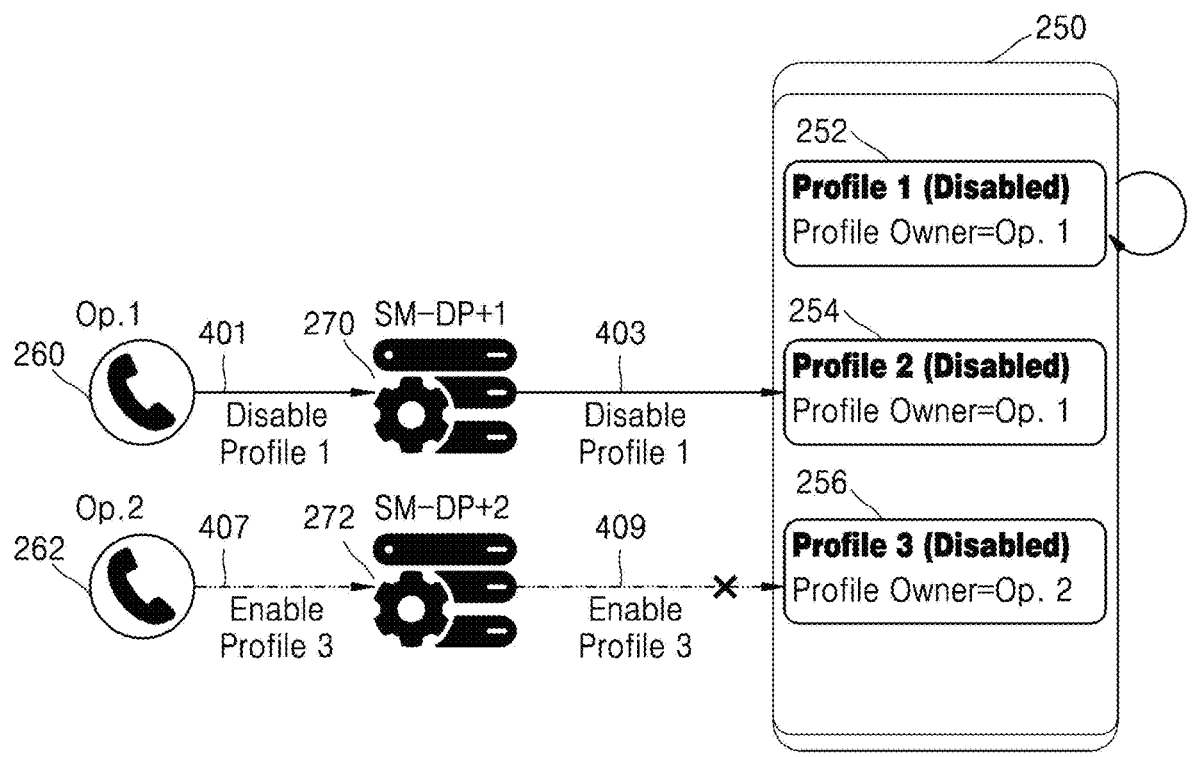
FIG. 4 illustrates another example for describing a procedure in which a mobile operator remotely manages a profile in a UE through a profile server when there is an enabled profile in the UE, according to an embodiment of the disclosure.

FIG. 4 illustrates another example for describing a procedure in which the first and second mobile operators 260 and 262 remotely manage the second profile 254 or the third profile 256 in the UE 250 through the first and second profile servers 270 and 272 when the first profile 252 is in the enabled state in the UE 250, according to an embodiment of the disclosure. A description of settings of the UE 250 and each of the first through third profiles 252, 254, and 256 will refer to FIGS. 3A to 3C.

Referring to FIG. 4, in operation 401, the first mobile operator 260 may transmit a request for remote management of the first profile 252 owned by the first mobile operator 260 to the first profile server 270. For example, operation 401 may be an operation of requesting disabling of the first profile 252 currently in the enabled state in the UE 250. According to some embodiments of the disclosure, operation 401 may use the "RPM Order" message.

In operation 403, the first profile server 270 may determine whether the first mobile operator 260 is a profile owner of the first profile 252. The first profile server 270 may manage an OID of the first mobile operator 260 and information of all profiles owned by the first mobile operator 260, and identify and determine a profile owner of each profile. When the first profile server 270 determines that the first mobile operator 260 is an owner of the first profile 252, the first profile server 270 may generate a remote management command for the first profile 252 and transmit the same to the UE 250. For example, the remote management command may be a command enabling the first profile 252. According to some embodiments of the disclosure, operation 403 may use at least one of the "Initiate Authentication" message or the "Authenticate Client" message.

In operation 405, the UE 250 may disable the first profile 252 in the enabled state. Thereafter, when there is no other means (e.g., Wi-Fi, etc.) that provides network connection to the UE 250, the UE 250 may lose network connection.

In operation 407, the second mobile operator 262 may transmit a request for remote management of the third profile 256 owned by the second mobile operator 262 to the second profile server 272. For example, operation 407 may be an operation of requesting enabling of the third profile 256 currently in a disabled state in the UE 250. According to some embodiments of the disclosure, operation 407 may use the "RPM Order" message.

In operation 409, the second profile server 272 may determine whether the second mobile operator 262 is a profile owner of the third profile 256. The second profile server 272 may manage an OID of the second mobile operator 262 and information of all profiles owned by the second mobile operator 262, and identify and determine a profile owner. When the second profile server 272 determines that the second mobile operator 262 is an owner of the third profile 256, the second profile server 272 may generate a remote management command for the third profile 256 and transmit the same to the UE 250. For example, the remote management command may be a command for enabling the third profile 256. According to some embodiments of the disclosure, operation 409 may use at least one of the "Initiate Authentication" message or the "Authenticate Client" message.

However, the UE 250 loses network connection in operation 405, such that the remote management command of the second profile server 272 may not be delivered to the UE 250 in operation 409. Thus, a mobile operator who is not a profile owner of a currently enabled profile in the UE 250 may have a difficulty in enabling a profile owned by the mobile operator through a remote management command.

Figure 5:
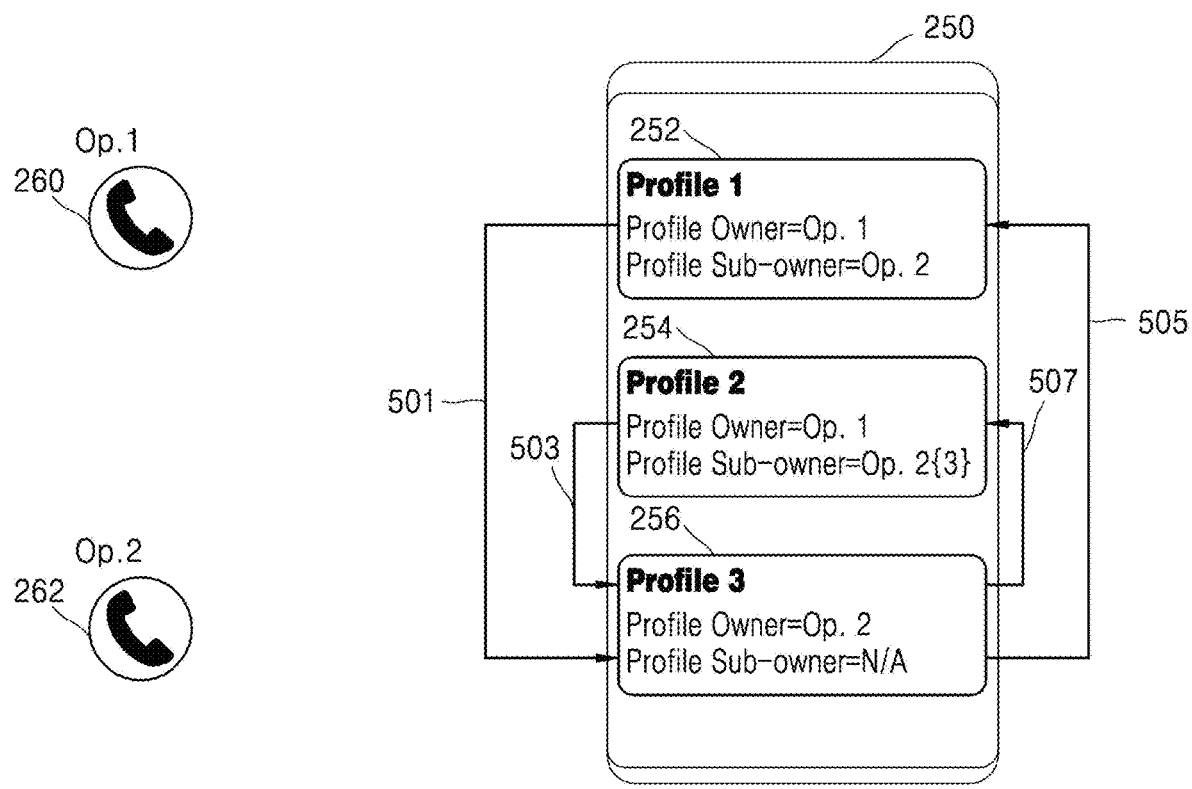
FIG. 5 illustrates an example for describing a method of defining and using profile owner information and profile sub-owner information in a profile, according to an embodiment of the disclosure.

FIG. 5 illustrates an example for describing a method of additionally defining and using profile owner information and profile sub-owner information in a profile, according to an embodiment of the disclosure.

Referring to FIG. 5, the first profile 252 and the second profile 254 owned by the first mobile operator 260, and the third profile 256 owned by the second mobile operator 262 may be installed in the UE 250. Unlike in the embodiments of the disclosure shown in FIGS. 2 through 4 where profile owner information is stored in each profile, FIG. 5 shows a case where profile sub-owner information is additionally described in each profile. A profile sub-owner may indicate at least one profile owner of a profile capable of implicitly disabling another profile. For example, the profile sub-owner of the first profile 252 is the second mobile operator 262, such that when the first profile 252 is in the enabled state, the second mobile operator 262 may enable the third profile 256 owned by the second mobile operator 262 through the remote management command and the first profile 252 may be implicitly disabled.

A profile sub-owner may be referred to as a delegated profile owner or a profile delegated owner, a secondary profile owner or a profile secondary owner, or an allowed profile owner or an authorized profile owner, etc. Additionally, a counter indicating the number of times the profile may be implicitly disabled by the profile sub-owner may be recorded together with profile sub-owner information. For example, the second profile 254 may indicate that the profile sub-owner is the second mobile operator 262 and the implicit disable is allowed up to three times. It should be noted that one or more profile sub-owners may be defined in each profile. When a profile owner is designated in plural, an implicit disable counter for each profile sub-owner may also be designated in plural. Moreover, while it is illustrated in FIG. 5 that profile sub-owner information is recorded in a profile, the profile sub-owner information may also be included in the remote management command. This will be described in detail when describing operation 609 of FIG. 6.

Operation 501 shows a procedure for determining whether the first profile 252 may be enabled by the remote management command when the third profile 256 is in the enabled state. In operation 501, the UE 250 may compare the profile owner of the third profile 256 with the profile owner of the first profile 252 to determine whether at least one profile owner of the third profile 256 is identical to at least one profile owner of the first profile 252. The profile owners of the two profiles are different from each other, such that the UE 250 may compare the profile sub-owner of the third profile 256 with the profile owner of the first profile 252 to determine whether at least one profile sub-owner of the third profile 256 is identical to at least one profile owner of the first profile 252. The profile sub-owner of the third profile 256 is not defined, such that eventually, the first profile 252 may be enabled by the remote management command when the third profile 256 is in the enabled state.

Operation 503 shows a procedure for determining whether the second profile 254 may be enabled by the remote management command when the third profile 256 is in the enabled state. In operation 503, the UE 250 may compare the profile owner of the third profile 256 with the profile owner of the second profile 254 to determine whether at least one profile owner of the third profile 256 is identical to at least one profile owner of the second profile 254. The profile owners of the two profiles are different from each other, such that the UE 250 may secondarily compare the profile sub-owner of the third profile 256 with the profile owner of the second profile 254 to determine whether at least one profile sub-owner of the third profile 256 is identical to at least one profile owner of the second profile 254. The profile sub-owner of the third profile 256 is not defined, such that eventually, the second profile 254 may be enabled by the remote management command when the third profile 256 is in the enabled state.

Operation 503 may assume a case where one profile may be in the enabled state in the UE. When two or more profiles in the UE may be in the enabled state, the profile owner or the profile sub-owner may be checked when a profile may not be enabled any longer in the UE. For example, when two profiles are in the enabled state and the first profile 252 is enabled in the UE 250, the UE 250, upon receiving the enable remote management command for the second profile 254, may immediately enable the second profile 254 without checking the profile owner or the profile sub-owner. In another example, when two profiles may be in the enabled state and the first profile 252 and the second profile 254 are enabled in the UE 250, the UE 250, upon receiving the enable remote management command for the third profile 256, may check the profile owners or the profile sub-owners of the first profile 252 and the third profile 256, and when it is not possible to enable the third profile 256, the UE 250 may check the profile owners or the profile sub-owners of the second profile 254 and the third profile 256. When it is still not possible to enable the third profile 256, the UE 250 may finally determine that it is not possible to enable the third profile 256 through the remote management command. As such, a case where one or more profiles may be in the enabled state in a UE will be described in detail with reference to FIG. 7B.

Operation 505 shows a procedure for determining whether the third profile 256 may be enabled by the remote management command when the first profile 252 is in the enabled state. In operation 505, the UE 250 may compare the profile owner of the first profile 252 with the profile owner of the third profile 256 to determine whether at least one profile owner of the first profile 252 is identical to at least one profile owner of the third profile 256. The profile owners of the two profiles are different from each other, such that the UE 250 may secondarily compare the profile sub-owner of the first profile 252 with the profile owner of the third profile 256 to determine whether at least one profile sub-owner of the first profile 252 is identical to at least one profile owner of the third profile 256. The profile sub-owner of the first profile 252 and the profile sub-owner of the third profile 256 correspond to the second mobile operator 262, such that when the first profile 252 is in the enabled state, the third profile 256 may be enabled by the remote management command and the first profile 252 may be implicitly disabled. The profile sub-owner of the first profile 252 has no limitation with respect to an implicit disable counter of the implicit disable, such that operation 505 may be repeated several times without any restriction.

Operation 507 shows a procedure for determining whether the third profile 256 may be enabled by the remote management command when the second profile 254 is in the enabled state. In operation 507, the UE 250 may compare the profile owner of the second profile 254 with the profile owner of the third profile 256 to determine whether at least one profile owner of the second profile 254 is identical to at least one profile owner of the third profile 256. The profile owners of the two profiles are different from each other, such that the UE 250 may secondarily compare the profile sub-owner of the second profile 254 with the profile owner of the third profile 256 to determine whether at least one profile sub-owner of the second profile 254 is identical to at least one profile owner of the third profile 256. The profile sub-owner of the second profile 254 and the profile sub-owner of the third profile 256 correspond to the second mobile operator 262, such that when the second profile 254 is in the enabled state, the third profile 256 may be enabled by the remote management command and the second profile 254 may be implicitly disabled. The profile sub-owner of the second profile 254 has a limitation with respect to an implicit disable counter of the implicit disable as three times, such that operation 507 is allowed up to three times. To this end, the UE 250 may decrement the implicit disable counter of the implicit disable of the second profile 254 each time operation 507 is performed, and after repetition of operation 507 three times, the UE 250 may prevent additional allowance by deleting profile sub-owner information of the second profile 254. Although a profile server is not shown in the drawing for convenience, the mobile operator may configure or update profile owner or profile sub-owner information of the first profile 252, the second profile 254, and the third profile 256 through one or more profile servers, and the profile owner information or the profile sub-owner information of each profile may be stored in one or more profile servers as well as in the profile.

Figure 6:
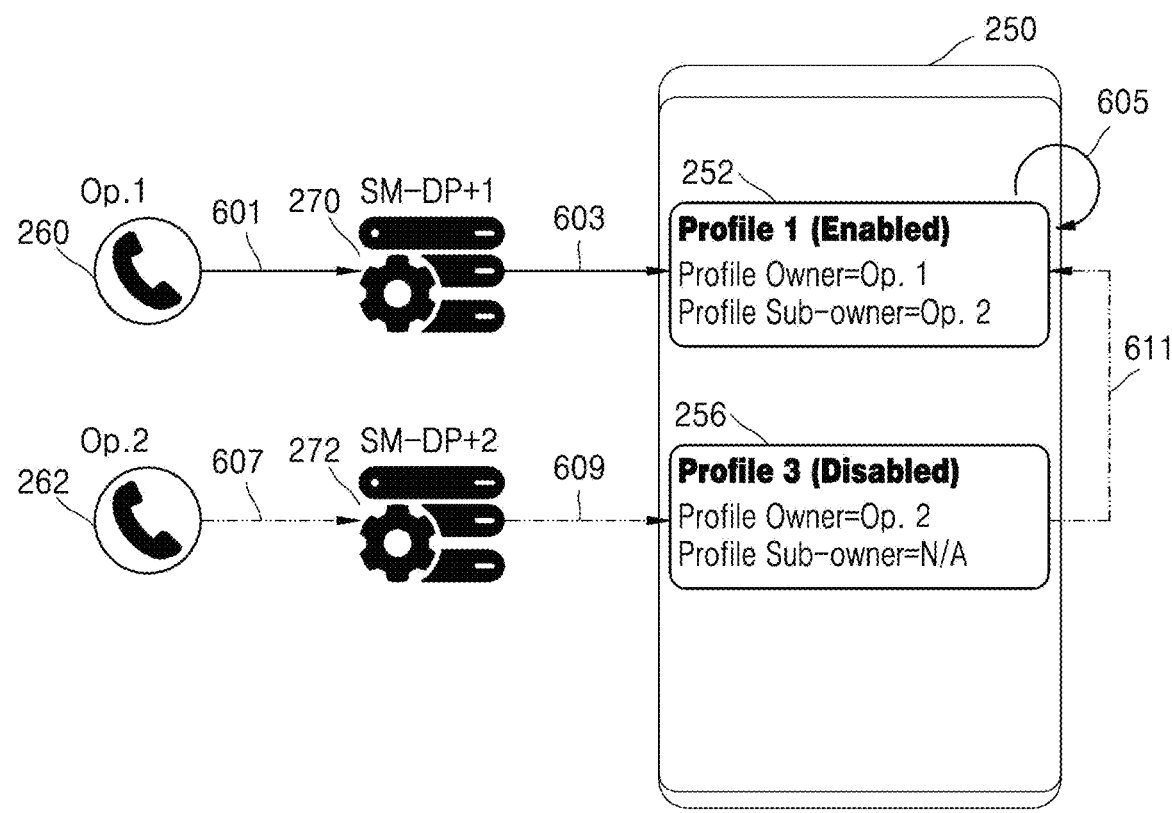
FIG. 6 illustrates an example for describing a procedure in which a mobile operator remotely manages a profile in a UE through a profile server when there is an enabled profile in the UE, according to an embodiment of the disclosure.

FIG. 6 illustrates another example for describing a procedure in which the first and second mobile operators and remotely manage the first profile or the third profile in the UE through the first and second profile servers and when the first profile is in the enabled state in the UE, according to an embodiment of the disclosure.

Referring to FIG. 6, the first profile 252 owned by the first mobile operator 260, and the third profile 256 owned by the second mobile operator 262 may be installed in the UE 250. It is assumed that profile sub-owner information is stored in each profile. It is also assumed that the profile sub-owner of the first profile 252 is the second mobile operator 262, the implicit disable counter of the implicit disable does not exist, and there is no profile sub-owner of the third profile 256. Although it is illustrated in the drawing for convenience that the first profile server 270 and the second profile server 272 are different servers, the first profile server 270 and the second profile server 272 may also be implemented with one server. According to an embodiment of the disclosure, profile owner or profile sub-owner information of the first profile 252 and/or the second profile 254 may be stored in the profile server as well as in each profile.

In operation 601, the first mobile operator 260 may transmit a request for remote management of the first profile 252 owned by the first mobile operator 260 to the first profile server 270. For example, operation 601 may be an operation of requesting update of profile sub-owner information of profile summary information (Profile Metadata) of the first profile 252 currently in the enabled state in the UE 250. According to some embodiments of the disclosure, operation 601 may use the "RPM Order" message.

In operation 603, the first profile server 270 may determine whether the first mobile operator 260 is a profile owner of the first profile 252. To this end, the first profile server 270 may manage an OID of the first mobile operator 260 and information of all profiles owned by the first mobile operator 260, and identify and determine a profile owner of each profile. When the first profile server 270 determines that the first mobile operator 260 is an owner of the first profile 252, the first profile server 270 may generate a remote management command for the first profile 252 and transmit the same to the UE 250. For example, the remote management command may be a command for updating the profile summary information (Profile Metadata) of the first profile 252. According to some embodiments of the disclosure, operation 603 may use at least one of the "Initiate Authentication" message or the "Authenticate Client" message.

In operation 605, the UE 250 may update the profile summary information (Profile Metadata) of the first profile 252. The UE 250 may set the profile sub-owner of the first profile 252 to the second mobile operator 262. When the profile sub-owner has already been set in the first profile 252, operations 601 through 605 may be skipped.

In operation 607, the second mobile operator 262 may transmit a request for remote management of the third profile 256 owned by the second mobile operator 262 to the second profile server 272. For example, operation 607 may be an operation of requesting enabling of the third profile 256 currently in a disabled state in the UE 250. According to some embodiments of the disclosure, operation 607 may use the "RPM Order" message.

In operation 609, the second profile server 272 may determine whether the second mobile operator 262 is a profile owner of the third profile 256. The second profile server 272 may manage an OID of the second mobile operator 262 and information of all profiles owned by the second mobile operator 262, and determine and identify a profile owner. When the second profile server 272 determines that the second mobile operator 262 is an owner of the third profile 256, the second profile server 272 may generate a remote management command for the third profile 256 and transmit the same to the UE 250. For example, the remote management command may be a command for enabling the third profile 256. The remote management command may further include profile sub-owner information to be referred to by the UE 250 for enabling of the third profile 256. For example, the remote management command may be a command for enabling the third profile 256 and implicitly disabling the first profile 252 when the first mobile operator 260 is set as the profile owner of the first profile 252 currently in the enabled state in the UE 250. According to some embodiments of the disclosure, operation 609 may use at least one of the "Initiate Authentication" message or the "Authenticate Client" message.

In operation 611, the UE 250 may compare the profile owner of the first profile 252 with the profile owner of the third profile 256 to determine whether at least one profile owner of the first profile 252 is identical to at least one profile owner of the third profile 256. The profile owners of the two profiles are different from each other, such that the UE 250 may secondarily compare the profile sub-owner of the first profile 252 with the profile owner of the third profile 256 to determine whether at least one profile sub-owner of the first profile 252 is identical to at least one profile owner of the third profile 256 are identical to each other. The profile sub-owner of the first profile 252 and the profile sub-owner of the third profile 256 correspond to the second mobile operator 262, such that when the first profile 252 is in the enabled state, the third profile 256 may be enabled by the remote management command and the first profile 252 may be implicitly disabled.

Referring to FIG. 6, when a profile is enabled by the remote management command as in operation 611, the UE may perform at least one of the following comparisons:

(A) comparing a profile owner of a target profile to be enabled by the remote management command and a profile sub-owner of a currently enabled profile to determine whether at least one profile owner of the target profile to be enabled is identical to at least one profile sub-owner of the currently enabled profile;

(B) comparing (verifying) a profile sub-owner of the target profile to be enabled by the remote management command with a profile owner of the currently enabled profile to determine whether at least one profile sub-owner of the target profile to be enabled is identical to at least one profile owner of the currently enabled profile; and (C) comparing (verifying) the profile sub-owner of the target profile to be enabled by the remote management command with the profile sub-owner of the currently enabled profile to determine whether at least one profile sub-owner of the target profile to be enabled is identical to at least one profile sub-owner of the currently enabled profile.

This operation may also be referred to as profile sub-owner check. In the disclosure, the profile sub-owner check is mainly used to mean (A), but may further include (B) and (C). In the disclosure, the profile owner check may be integrated with and may be used as the same meaning as the profile sub-owner check.

Figure 7A:
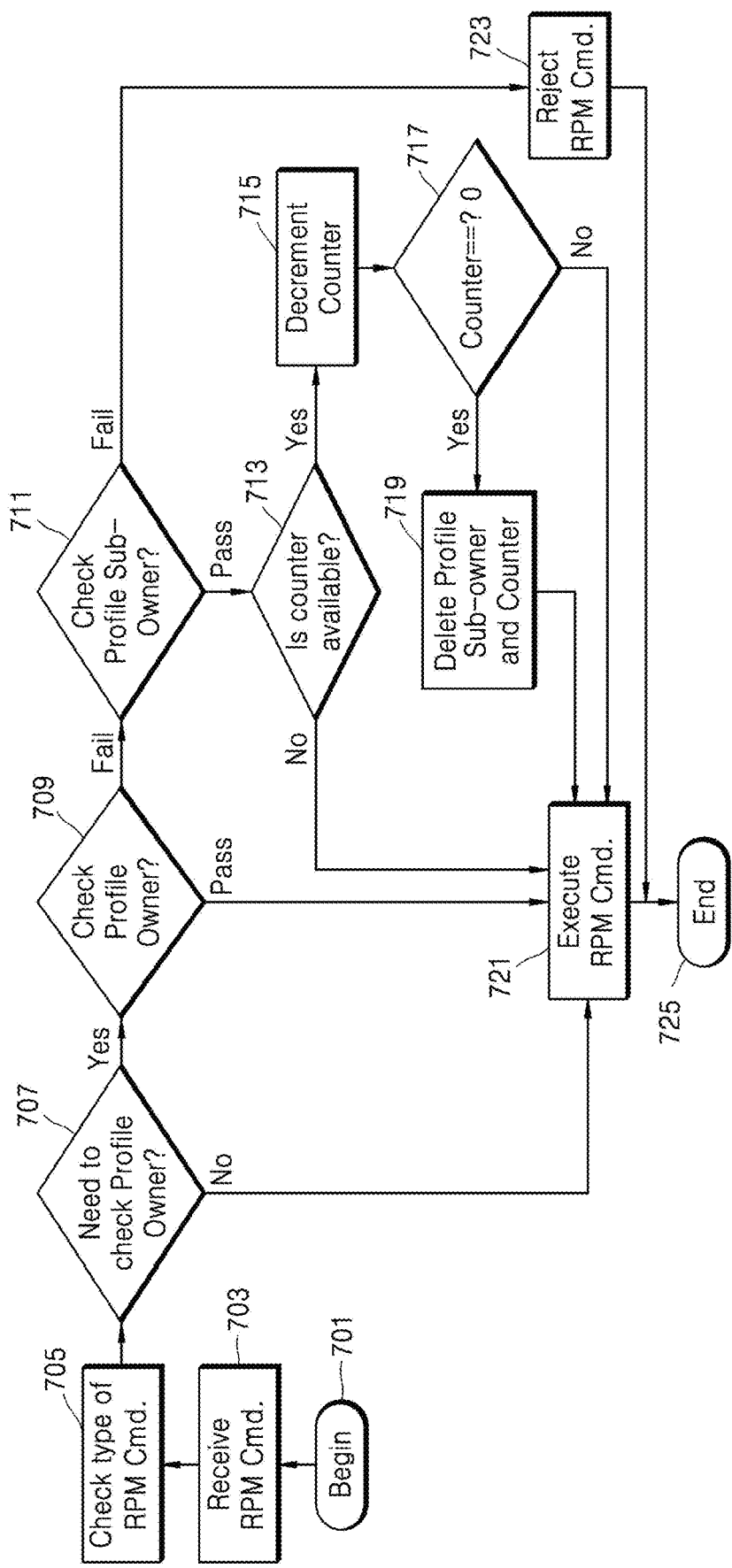
FIG. 7A illustrates an example of a method, performed by a UE, of checking profile owner information and profile sub-owner information and processing a remote management command, according to an embodiment of the disclosure.

FIG. 7A illustrates a procedure for comparing a profile owner of a target profile with a profile sub-owner of a currently enabled profile to determine whether at least one profile owner of the target profile is identical to at least one profile sub-owner of the currently enabled profile, when the UE receives the remote management command, according to an embodiment of the disclosure.

Referring to FIG. 7, in operation 701, the UE 250 may start operating.

In operation 703, the UE 250 may receive the remote management command.

In operation 705, the UE 250 may determine a type of the received remote management command.

In operation 707, the UE 250 may determine whether profile owner check is needed for execution of the remote management command. When the profile owner check is not needed (e.g., when the remote management command is disabling, deletion, update, etc., of the profile or when the remote management command is intended to enable a particular profile in case of absence of a currently enabled profile as shown in FIG. 2), the UE 250 may perform operation 721. When the profile owner check is needed (e.g., in case of existence of the currently enabled profile as shown in FIGS. 3B and 4, when another profile is enabled), the UE 250 may perform operation 709.

In operation 709, the UE 250 may determine a profile owner. The UE 250 may compare the profile owner of the currently enabled profile with the profile owner of the target profile to be enabled by the remote management command to determine whether at least one profile owner of the currently enabled profile is identical to at least one profile owner of the target profile to be enabled. When at least one profile owner of the profile is identical to at least one profile owner of the other profile, the UE 250 may perform operation 721. When the profile owners of the two profiles are different from each other, the UE 250 may perform operation 711.

In operation 711, the UE 250 may perform profile sub-owner check. The UE 250 may compare the profile sub-owner of the currently enabled profile with the profile owner of the target profile to be enabled by the remote management command to determine whether at least one profile sub-owner of the currently enabled profile is identical to at least one profile owner of the target profile to be enabled. When the profile sub-owner of the currently enabled profile and the profile owner of the target profile to be enabled by the remote management command are different, the UE 250 may perform operation 723. When at least one profile sub-owner of the currently enabled profile and at least one profile owner of the target profile to be enabled by the remote management command are identical to each other, the UE 250 may perform operation 713.

Operations 709 and 711 are illustrated separately in FIG. 7A, but operations 709 and 711 may be performed as one operation.

In operation 713, the UE 250 may determine whether an implicit disable counter for the profile sub-owner of the currently enabled profile is set or exists. When there is no implicit disable counter, the UE 250 may perform operation 721. When there is an implicit disable counter, the UE 250 may perform operation 715.

In operation 715, the UE 250 may decrement the implicit disable counter of the currently enabled profile by 1.

In operation 717, the UE 250 may determine whether the implicit disable counter of the currently enabled profile is 0. When the implicit disable counter is greater than 0, the UE 250 may perform operation 721. When the implicit disable counter is equal to 0, the UE 250 may perform operation 719.

In operation 719, the UE 250 may delete the profile sub-owner of the currently enabled profile and the implicit disable counter of the currently enabled profile.

In operation 721, the UE 250 may execute the remote management command. When the remote management command is intended to disable, delete, or update the profile, the UE 250 may disable, delete, or update the corresponding target profile. In another example, when the remote management command is intended to enable a particular profile when there is no currently enabled profile, the UE 250 may enable the target profile. In another example, when the remote management command is intended to enable another profile when there is a currently enabled profile, the UE 250 may first disable the currently enabled profile and then enable the target profile. The UE 250 may generate a message indicating an execution success as a result of execution of the remote management command. The message indicating the execution success may use, for example, a load RPM package result message.

In operation 723, the UE 250 may reject the remote management command. The UE 250 may generate an error code expressing profile owner mismatch, profile sub-owner mismatch, or other various reasons why the remote management command may not be executed. According to some embodiments of the disclosure, the error code may be expressed as a character string or as a corresponding number string. The UE 250 may generate a message indicating an execution failure as the execution result of the remote management command, include the error code in the message, and apply a digital signature to the entire message or a part thereof when necessary. The message indicating the execution success may use, for example, a load RPM package result message.

In operation 725, the UE 250 may stop operating and wait for receiving a further remote management execution.

According to various embodiments of the disclosure, in the communication system, the UE may process the remote management command by using the profile owner and/or profile sub-owner information of the installed profiles, and change the mobile operator without a loss of network connection. According to various embodiments of the disclosure, in the communication system, the profile server may control the profile sub-owner information of the profiles installed in the UE to set the profile remote management execution authority and support mobile operator change of the UE.

Figure 7B:
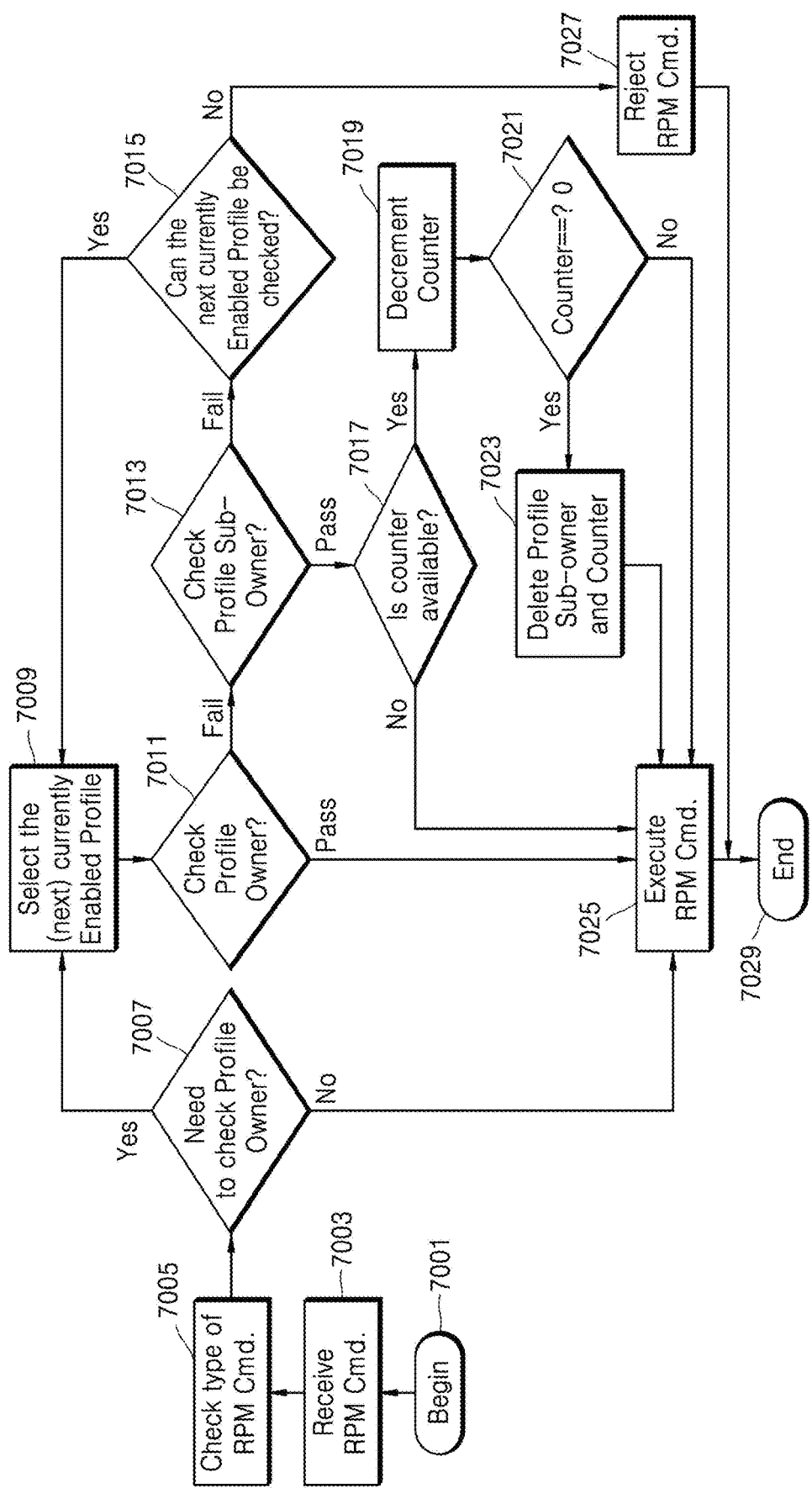
FIG. 7B illustrates a procedure for comparing a profile owner of a target profile with a profile sub-owner of a currently enabled profile to determine whether at least one profile owner of the target profile and at least one profile sub-owner of the currently enabled profile are identical to each other, when a UE is capable of enabling two or more profiles and receives a remote management command, according to an embodiment of the disclosure.

FIG. 7B illustrates a procedure for comparing a profile owner of a target profile with a profile sub-owner of a currently enabled profile to determine whether at least one profile owner of the target profile is identical to at least one profile sub-owner of the currently enabled profile, when the UE is capable of enabling two or more profiles and receives a remote management command, according to an embodiment of the disclosure.

Referring to FIG. 7B, in operation 7001, the UE 250 may start operating.

In operation 7003, the UE 250 may receive the remote management command.

In operation 7005, the UE 250 may determine a type of the received remote management command.

In operation 7007, the UE 250 may determine whether profile owner check is needed for execution of the remote management command. When the profile owner check is not needed (e.g., when the remote management command, which is disabling, deletion, update, etc., of the profile, is intended to enable a particular profile in case of absence of a currently enabled profile as shown in FIG. 2, or when fewer profiles than a number of profiles that may be enabled by the UE (e.g., a maximum number or a set number of profiles that may be enabled by the UE) are currently enabled and thus an additional profile may be enabled, such that a particular profile is enabled), the UE 250 may perform operation 7025. When the profile owner check is needed (e.g., in case of existence of the currently enabled profile as shown in FIGS. 3B and 4, when another profile is enabled), the UE 250 may perform operation 7009.

In operation 7009, the UE 250 may select one of two or more currently enabled profiles. A priority for selecting, by the UE 250, one of two or more currently enabled profiles may be based on, but not limited to, the following schemes:
  a profile owned by a profile owner of a target profile is preferentially selected (higher priority);
  a profile owned by a profile sub-owner of the target profile is preferentially selected (higher priority);
  a profile installed first is preferentially selected (higher priority);
  a profile supporting the same radio access technology as that supported by the target profile is preferentially selected (higher priority);
  a profile that has not yet been selected is preferentially selected (higher priority); and
  a profile selected in random order.

In operation 7011, the UE 250 may determine a profile owner. More specifically, the UE 250 may compare the profile owner of the profile selected in operation 7009 among the currently enabled profiles with the profile owner of the target profile to be enabled by the remote management command to determine whether at least one profile owner of the selected profile is identical to at least one profile owner of the target profile to be enabled. When at least one profile owner of the profile is identical to at least one profile owner of the other profile, the UE 250 may perform operation 7025. When the profile owners of the two profiles are different from each other, the UE 250 may perform operation 7013.

In operation 7013, the UE 250 may perform profile sub-owner check. The UE 250 may compare the profile sub-owner of the profile selected in operation 7009 among the currently enabled profiles with the profile owner of the target profile to be enabled by the remote management command to determine whether at least one profile sub-owner of the selected profile is identical to at least one profile owner of the target profile. When the profile sub-owner of the currently enabled profile and the profile owner of the target profile to be enabled by the remote management command are different, the UE 250 may perform operation 7015. When at least one profile sub-owner of the currently enabled profile and at least one profile owner of the target profile to be enabled by the remote management command are identical to each other, the UE 250 may perform operation 7017.

According to an embodiment of the disclosure, operations 7011 and 7013 are illustrated separately in FIG. 7B, but operations 7011 and 7013 may be performed as one operation.

In operation 7015, the UE 250 may determine whether another profile may be selected from among the two or more currently enabled profiles in operation 7009. When the profile owners and the profile sub-owners of the two or more currently enabled profiles have already been compared with the profile owner of the target profile in operations 7011 and 7013, the UE 250 may perform operation 7027. When the profile owner and the profile sub-owner of any one of the two or more currently enabled profiles has not yet been compared with the profile owner of the target profile in operations 7011 and 7013, the UE 250 may perform operation 7009.

In operation 7017, the UE 250 may determine whether an implicit disable counter for the profile sub-owner of the profile selected in operation 7009 from among the currently enabled profiles is set or exists. When there is no implicit disable counter, the UE 250 may perform operation 7025. When there is an implicit disable counter, the UE 250 may perform operation 7019.

In operation 7019, the UE 250 may decrement the implicit disable counter of the profile selected in operation 7009 from among the currently enabled profiles by 1.

In operation 7021, the UE 250 may determine whether the implicit disable counter of the profile selected in operation 7009 from among the currently enabled profiles is 0. When the implicit disable counter is greater than 0, the UE 250 may perform operation 7025. When the implicit disable counter is equal to 0, the UE 250 may perform operation 7023.

In operation 7023, the UE 250 may delete the profile sub-owner and the implicit disable counter of the implicit disable of the profile selected in operation 7009 from among the currently enabled profiles.

In operation 7025, the UE 250 may execute the remote management command. For example, when the remote management command is intended to disable, delete, or update the profile, the UE 250 may disable, delete, or update the corresponding target profile. In another example, when the remote management command is intended to enable a particular profile when there is no currently enabled profile or one or more profiles may be additionally enabled in the UE 250 without disabling of another profile, the UE 250 may enable the target profile. In another example, when the remote management command is intended to enable another profile in case of existence of a currently enabled profile, the UE 250 may first disable the profile selected in operation 7009 from among the currently enabled profiles and then enable the target profile. The UE 250 may generate a message indicating an execution success as a result of execution of the remote management command. The message indicating the execution success may use, for example, a load RPM package result message.

In operation 7027, the UE 250 may reject the remote management command. The UE 250 may generate an error code expressing profile owner mismatch, profile sub-owner mismatch, or other various reasons why the remote management command may not be executed. According to some embodiments of the disclosure, the error code may be expressed as a character string or as a corresponding number string. The UE 250 may generate a message indicating an execution failure as the execution result of the remote management command, include the error code in the message, and apply a digital signature to the entire message or a part thereof when necessary. The message indicating the execution success may use, for example, a load RPM package result message.

In operation 7029, the UE 250 may stop operating and wait for receiving a further remote management execution.

According to various embodiments of the disclosure, in the communication system, the UE capable of enabling two or more profiles may process the remote management command with a plurality of profiles by using the profile owner and/or profile sub-owner information of the installed profiles, and change the mobile operator without a loss of network connection. According to various embodiments of the disclosure, in the communication system, the profile server may control the profile sub-owner information of the profiles installed in the UE to set the profile remote management execution authority and support mobile operator change of the UE.

Figure 8:
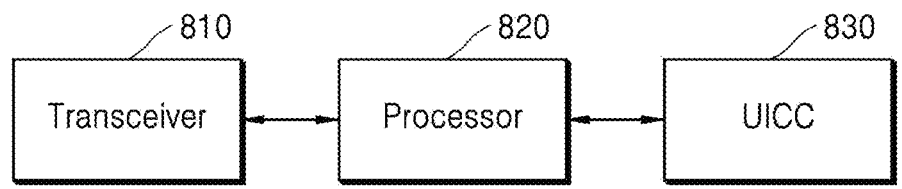
FIG. 8 is a block diagram of a UE according to an embodiment of the disclosure.

FIG. 8 is a block diagram of the UE according to an embodiment of the disclosure.

Referring to FIG. 8, the UE 250 may include a transceiver 810 and at least one processor 820. The UE 250 may also include a UICC 830. For example, the UICC 830 may be inserted into the UE 250 or may be an eUICC embedded in the UE 250. The at least one processor 820 may also be called a controller.

However, the configuration of the UE 250 is not limited to FIG. 8, and may include components that are more or less than those illustrated in FIG. 8. According to some embodiments of the disclosure, the transceiver 810, the at least one processor 820, and a memory (not shown) may be implemented in the form of one chip. When the UICC 830 is embedded, the UICC 830 may also implemented in the chip together with the transceiver 810, the at least one processor 820, and the memory. According to some embodiments of the disclosure, the transceiver 810 may transmit and receive a signal, information, data, etc., according to various embodiments of the disclosure to and from the profile server. The transceiver 810 may include an RF transmitter that up-converts and amplifies a frequency of a transmission signal and an RF signal that low-noise-amplifies a received signal and down-converts a frequency. However, this is merely an example of the transceiver 810, components of which are not limited to the RF transmitter and the RF receiver. The transceiver 810 may receive a signal through a radio channel and output the received signal to the at least one processor 820, and transmit a signal output from the at least one processor 820 through the radio channel.

According to some embodiments of the disclosure, the transceiver 810 may receive a message at least including a remote management command from the profile server. The transceiver 810 may respond with an execution result of the remote management command to the profile server.

Meanwhile, the at least one processor 820 may be a component for controlling the UE overall. The processor 820 may control overall operations of the UE according to various embodiments of the disclosure described above.

According to some embodiments of the disclosure, the processor 820 may recognize a type of the received remote management command, determine whether there is a currently enabled profile, determine whether profile owner check is needed, compare profile owners or profile sub-owners of a currently enabled profile and a target profile to be enabled by the remote management command to determine whether at least one profile owners or at least one profile sub-owners of the currently enabled profile and the target profile to be enabled are identical to each other, adjust a counter of implicit disable of the currently enabled profile, and generate a remote management command execution result message (Load RPM Package Result).

In addition, according to some embodiments of the disclosure, the at least one processor 820 may control the transceiver 810 to receive the remote management command from the profile server, process the remote management command, and transmit the remote management command execution message to the profile server.

The UICC 830 according to various embodiments of the disclosure may download a profile and install the profile. The UICC 830 may manage the profile.

According to some embodiments of the disclosure, the UICC 830 may operate under control of the processor 820. The UICC 830 may include a processor or controller for installing the profile, or an application may be installed in the UICC 830. The entire application or a part thereof may be installed in the processor 820.

The UE may further include a memory (not shown) in which data such as a basic program, an application program, configuration information, etc., for operations of the UE are stored. The memory may include at least one storage medium among a flash memory-type storage medium, a hard disk-type storage medium, a multimedia card micro-type storage medium, a card-type memory (e.g., an SD or XS memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). The processor 820 may perform various operations using various programs, contents, data, etc., stored in the memory.

Figure 9:
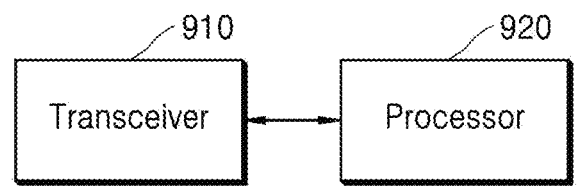
FIG. 9 is a block diagram of a profile server according to an embodiment of the disclosure.

FIG. 9 is a block diagram of a profile server according to an embodiment of the disclosure.

Referring to FIG. 9, the profile server may include a transceiver 910 and at least one processor 920. However, the configuration of the profile server is not limited to FIG. 9, and may include components that are more or less than those illustrated in FIG. 9. According to some embodiments of the disclosure, the transceiver 910, the at least one processor 920, and a memory (not shown) may be implemented in the form of one chip.

According to some embodiments of the disclosure, the transceiver 910 may transmit and receive a signal, information, data, etc., according to various embodiments of the disclosure to and from a UE or a mobile operator. For example, the transceiver 910 may receive a remote management request from a mobile operator, transmit a remote management command to the UE, and receive a remote management command execution result from the UE.

The transceiver 910 may include an RF transmitter that up-converts and amplifies a frequency of a transmission signal and an RF signal that low-noise-amplifies a received signal and down-converts a frequency. However, this is merely an example of the transceiver 910, components of which are not limited to the RF transmitter and the RF receiver. The transceiver 910 may receive a signal through a radio channel and output the received signal to the at least one processor 920, and transmit a signal output from the at least one processor 920 through the radio channel.

Meanwhile, the at least one processor 920 may be a component for controlling the profile server overall. The processor 920 may control overall operations of the profile server according to various embodiments of the disclosure described above. The at least one processor 920 may also be called a controller.

The processor 920 may receive the remote management request from the mobile operator, determine whether the mobile operator is a proper profile owner, generate the remote management command, transmit the remote management command to the UE, and receive the remote management command execution result from the UE.

An operator server may further include a memory (not shown) in which data such as a basic program, an application program, configuration information, etc., for operations of the operator server are stored. The memory may include at least one storage medium among a flash memory-type storage medium, a hard disk-type storage medium, a multimedia card micro-type storage medium, a card-type memory (e.g., an SD or XS memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). The processor 920 may perform various operations using various programs, contents, data, etc., stored in the memory.

According to disclosed embodiments of the disclosure, a service may be effectively provided in a mobile communication system.

In the above-described detailed embodiments of the disclosure, components included in the disclosure have been expressed as singular or plural according to the provided detailed embodiments of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

While embodiments of the disclosure have been described, various changes may be made without departing the scope of the disclosure. Therefore, the scope of the disclosure should be defined by the appended claims and equivalents thereof, rather than by the described embodiments of the disclosure.

It should be appreciated that various embodiments of the disclosure and the terms used therein are not intended to limit the technological features set forth herein to particular embodiments of the disclosure and include various changes, equivalents, or replacements for a corresponding embodiment of the disclosure. With regard to the description of the drawings, similar reference numerals may be used to refer to similar or related elements. It is to be understood that a singular form of a noun corresponding to an item may include one or more of the things, unless the relevant context clearly indicates otherwise. In the disclosure, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

The term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments of the disclosure as set forth herein may be implemented as software (e.g., a program) including one or more instructions that are stored in a storage medium (e.g., an internal memory or an external memory) that is readable by a machine (e.g., a computer). The machine may invoke stored instructions from the storage medium and operate according to the invoked instructions, and may include an electronic device (e.g., the UE 250) according to various embodiments of the disclosure. When the instructions are executed by a processor (for example, the processor 820 of FIG. 8 or the processor 920 of FIG. 9), the processor may perform functions corresponding to the instructions. The one or more instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a device, the method comprising:
   receiving a remote profile management command for enabling a target profile from a profile server;
   determining whether an enabled profile exists in the device, based on the remote profile management command being received;
   verifying whether information of a profile owner of the target profile is included in profile owner associated information of the enabled profile, in case that the enabled profile exists in the device, wherein the profile owner associated information comprises information of a profile owner of the enabled profile and information of an entity capable of implicitly disabling the enabled profile; and
   disabling the enabled profile and enabling the target profile, in case that the information of the profile owner of the target profile is included in the profile owner associated information of the enabled profile.

2. The method of claim 1, wherein the profile owner includes at least one of a service provider or an operator.

3. The method of claim 1, wherein in case that the information of the profile owner of the target profile is not included in the profile owner associated information of the enabled profile, the enabled profile is not capable of being implicitly disabled.

4. The method of claim 1, wherein the disabling of the enabled profile comprises:
   disabling the enabled profile; or
   marking the enabled profile as to be disabled and disabling the enabled profile after performing an operation.

5. The method of claim 4, wherein the operation comprises a refresh operation or a reset operation.

6. The method of claim 1, wherein the enabling of the target profile comprises:
   enabling the target profile; or
   marking the target profile as to be enabled and enabling the target profile after performing an operation.

7. The method of claim 6, wherein the operation comprises a refresh operation or a reset operation.

8. The method of claim 1, further comprising:
   rejecting the remote profile management command in case that the information of the profile owner of the target profile is not included in the profile owner associated information of the enabled profile.

9. The method of claim 8, further comprising:
   generating an error code indicating profile owner information mismatch.

10. A device comprising:
    a transceiver; and
    at least one processor coupled with the transceiver and configured to:
      receive a remote profile management command for enabling a target profile from a profile server,
      determine whether an enabled profile exists in the device, based on the remote profile management command being received,
      verify whether information of a profile owner of the target profile is included in profile owner associated information of the enabled profile, in case that the enabled profile exists in the device, wherein the profile owner associated information comprises information of a profile owner of the enabled profile and information of an entity capable of implicitly disabling the enabled profile, and
      disable the enabled profile and enable the target profile, in case that the information of the profile owner of the target profile is included in the profile owner associated information of the enabled profile.

11. The device of claim 10, wherein the profile owner includes at least one of a service provider or an operator.

12. The device of claim 10, wherein in case that the information of the profile owner of the target profile is not included in the profile owner associated information of the enabled profile, the enabled profile is not capable of being implicitly disabled.

13. The device of claim 10, wherein the at least one processor is further configured to:
    disable the enabled profile, or
    mark the enabled profile as to be disabled and disable the enabled profile after performing an operation.

14. The device of claim 13, wherein the operation comprises a refresh operation or a reset operation.

15. The device of claim 10, wherein the at least one processor is further configured to:
    enable the target profile, or
    mark the target profile as to be enabled and enable the target profile after performing an operation.

16. The device of claim 15, wherein the operation comprises a refresh operation or a reset operation.

17. The device of claim 10, wherein the at least one processor is further configured to:
- reject the remote profile management command in case that the information of the profile owner of the target profile is not included in the profile owner associated information of the enabled profile.

18. The device of claim 17, wherein the at least one processor is further configured to:
- generate an error code indicating profile owner information mismatch.

* * * * *